Aug. 12, 1941.   R. C. MACHLER   2,252,015
OPTICAL PYROMETRY
Filed March 28, 1938   7 Sheets-Sheet 1
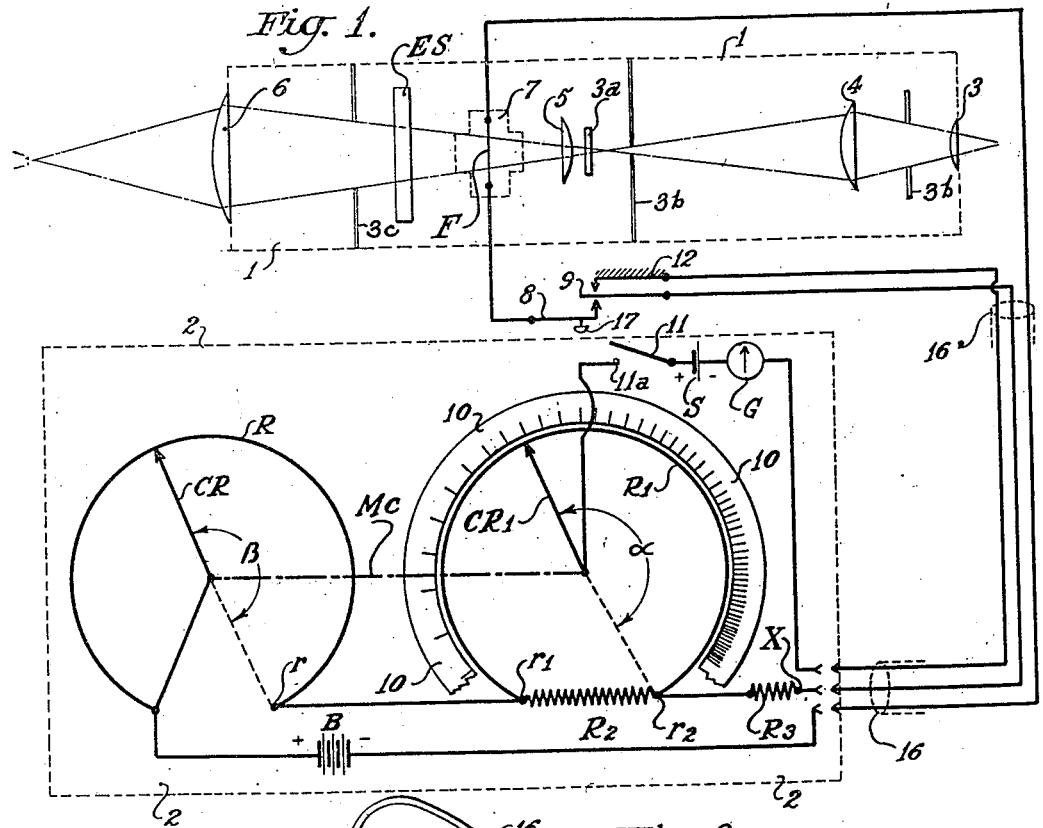
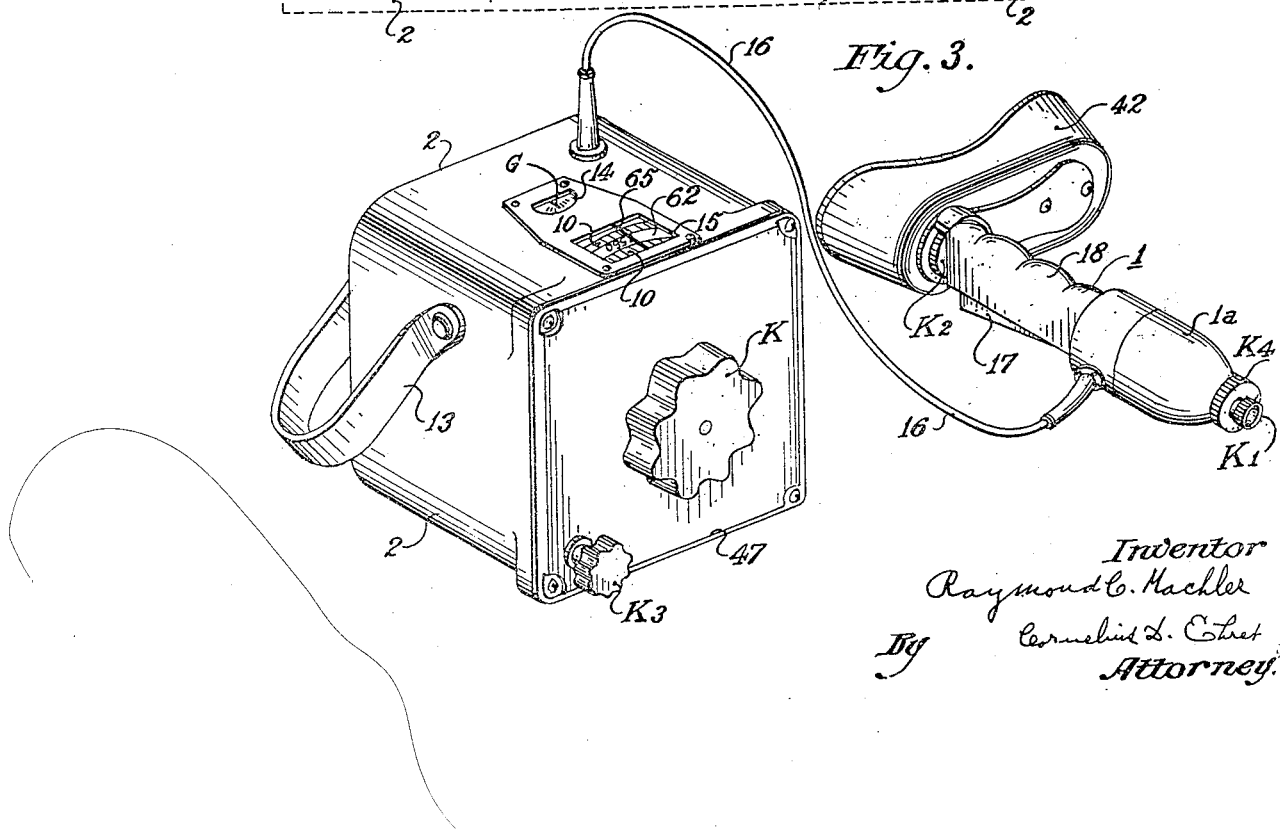
Inventor
Raymond C. Machler
By Cornelius D. Ehret
Attorney

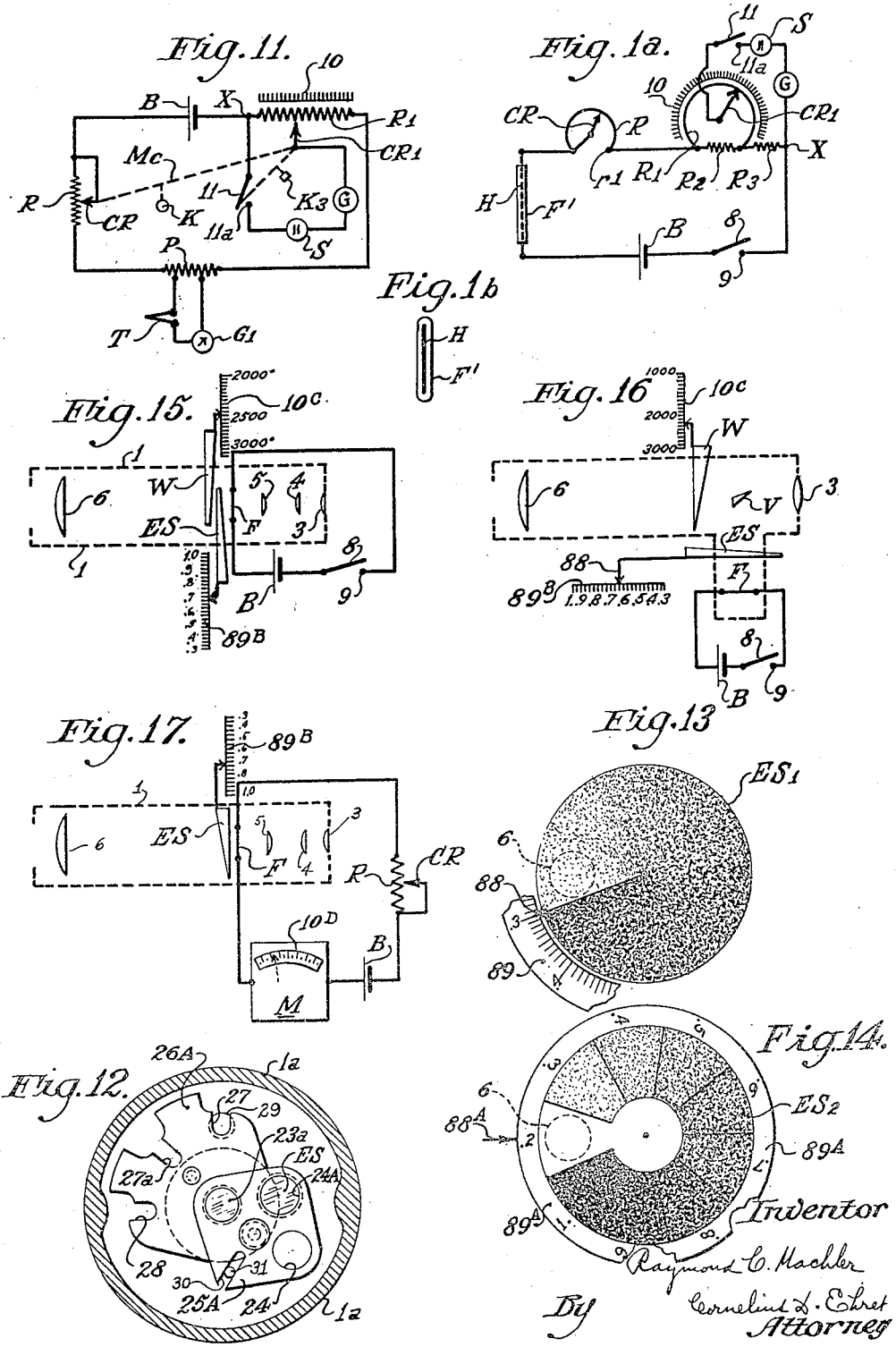

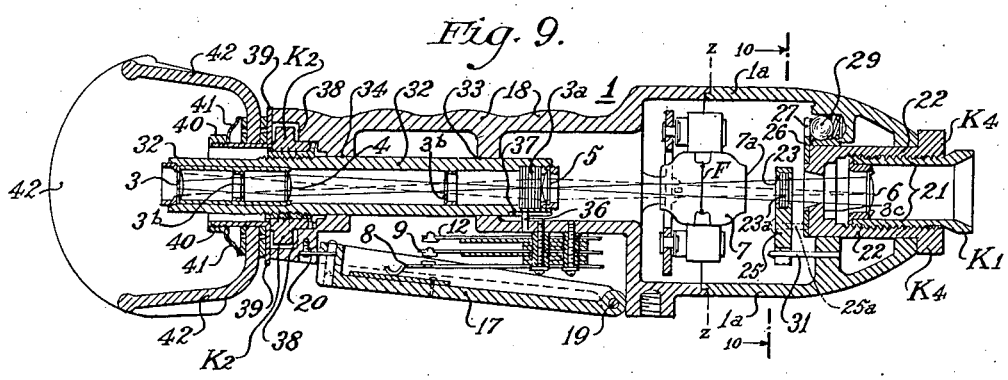
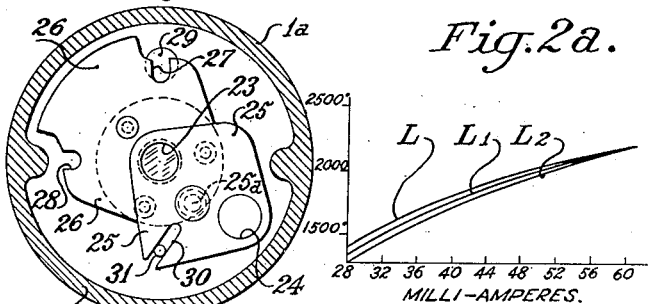
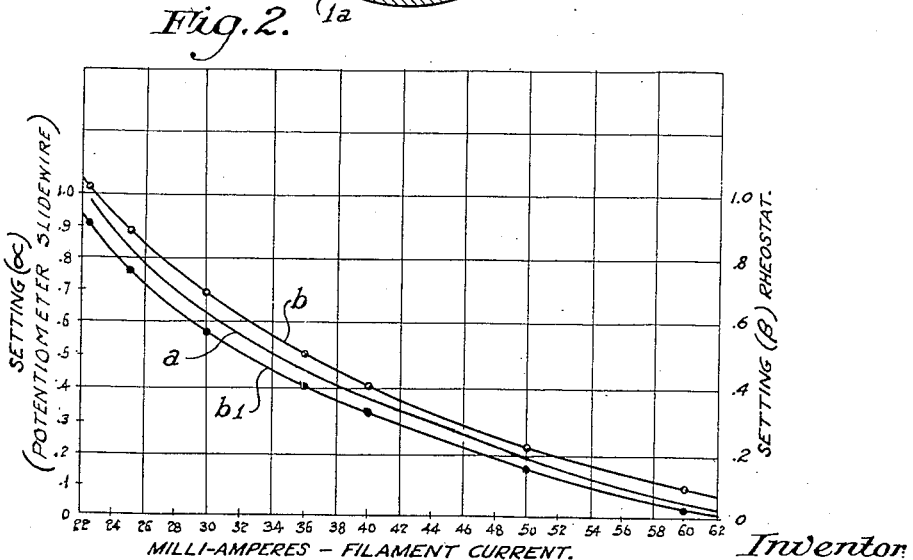

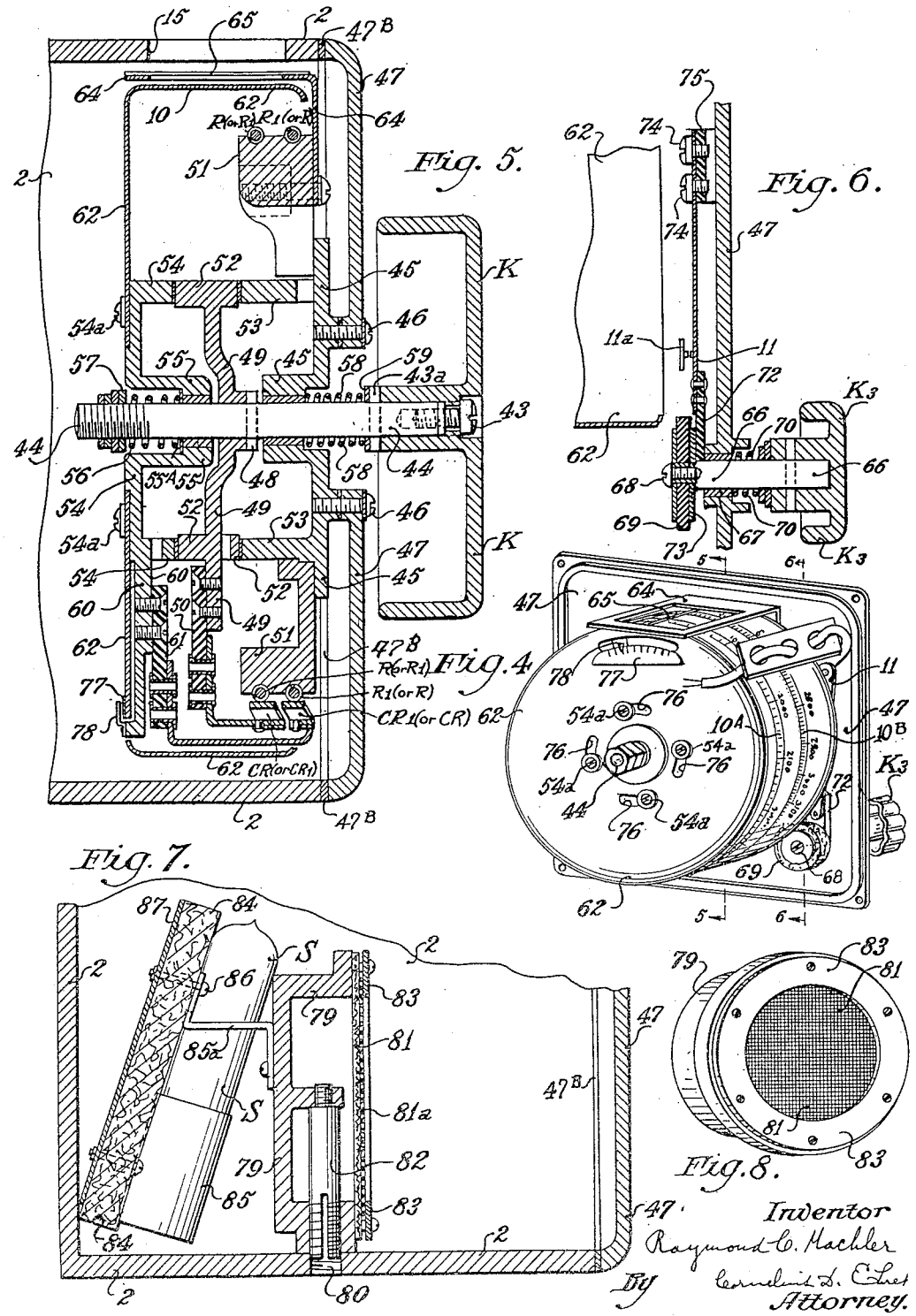

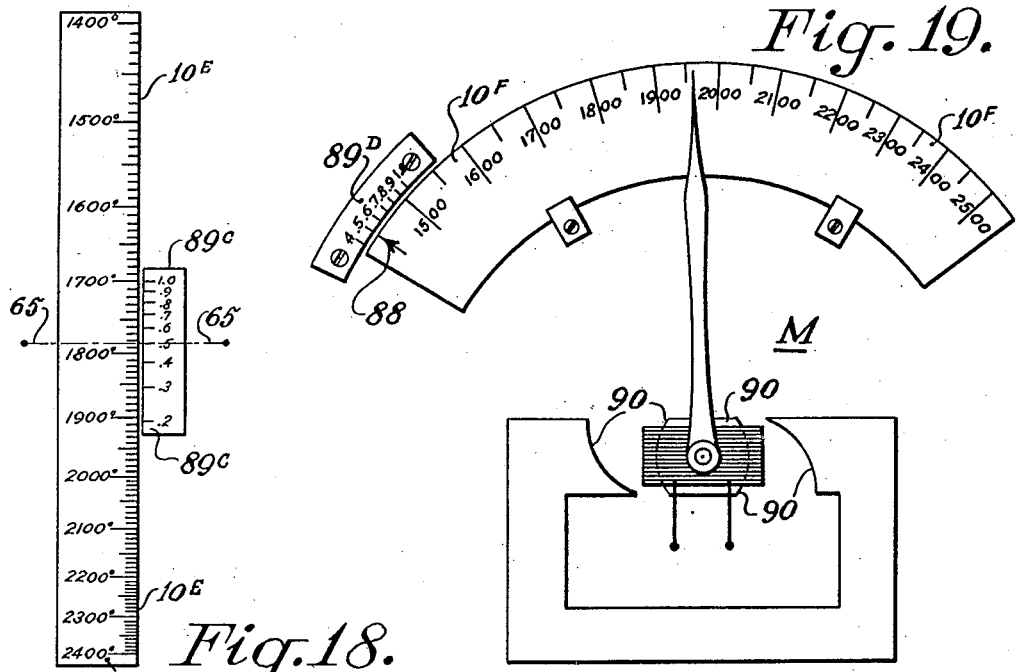
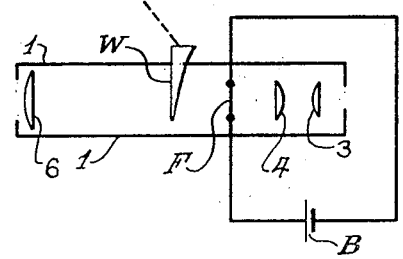
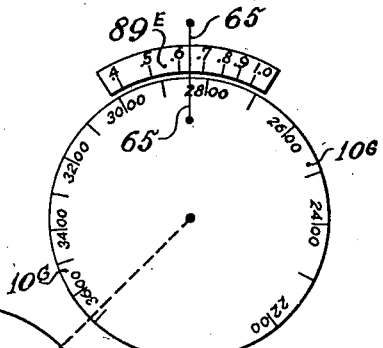
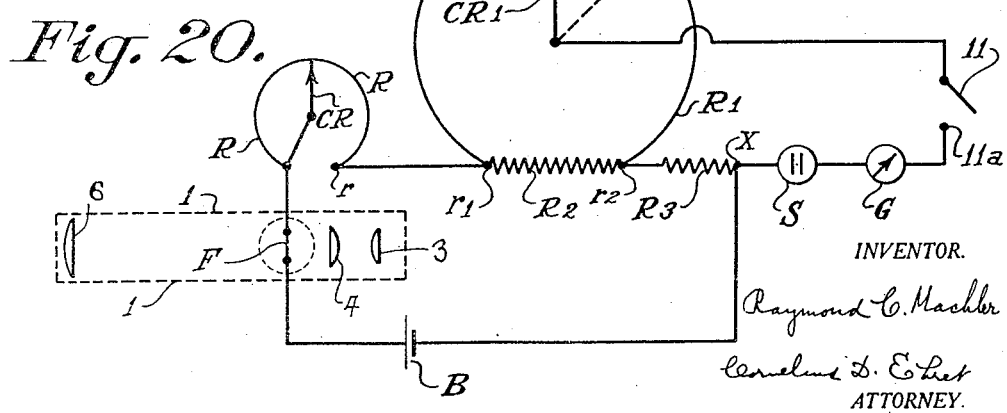

Aug. 12, 1941.  R. C. MACHLER  2,252,015
OPTICAL PYROMETRY
Filed March 28, 1938  7 Sheets-Sheet 6
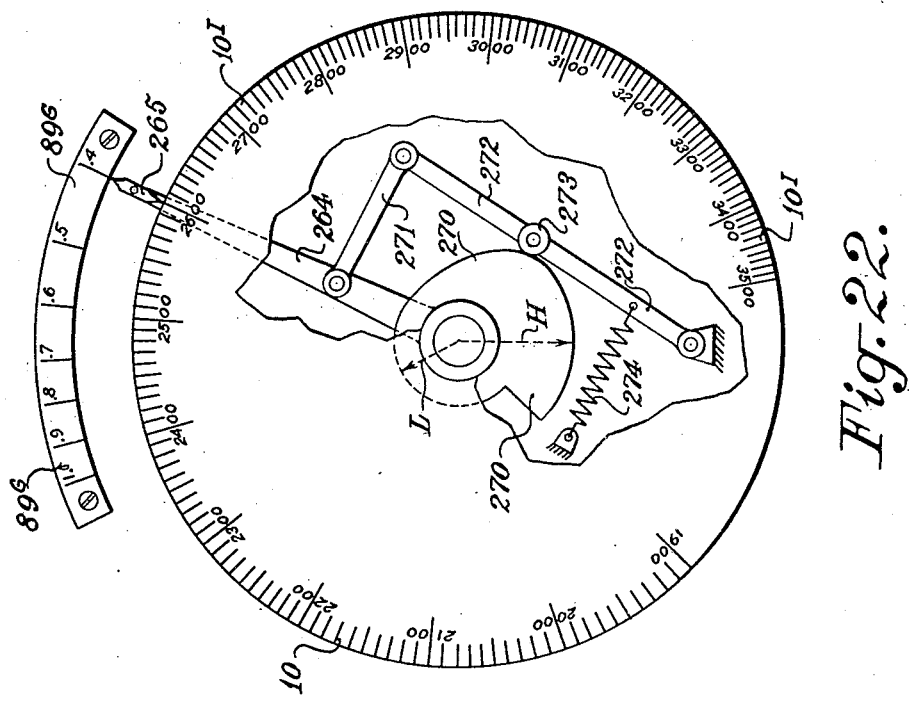
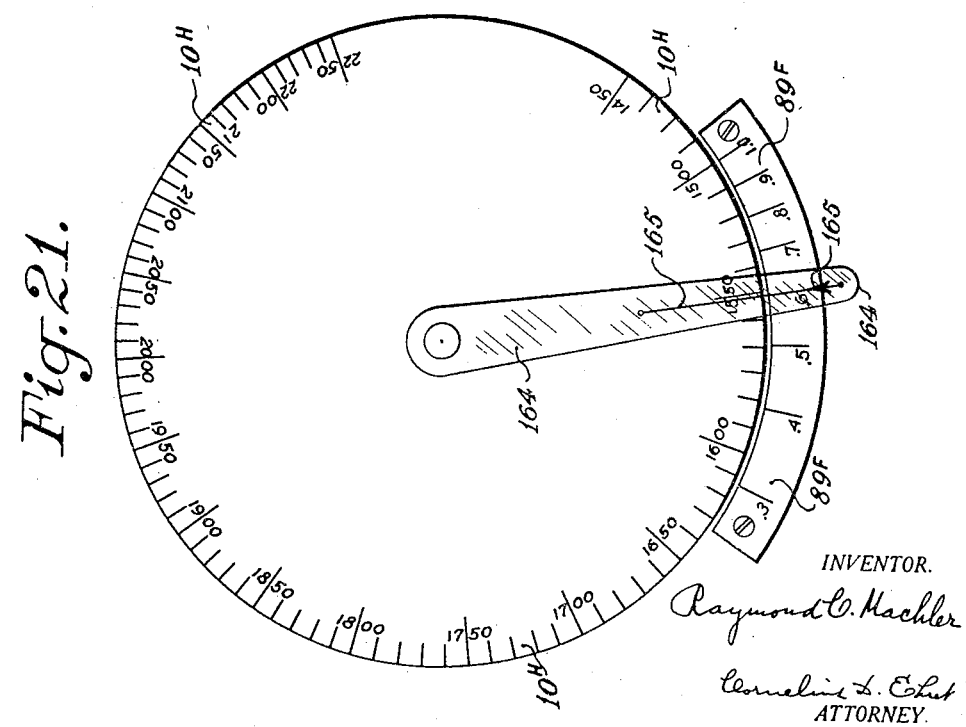
INVENTOR.
Raymond C. Machler
Cornelius L. Ebert
ATTORNEY.

Aug. 12, 1941.  R. C. MACHLER  2,252,015
OPTICAL PYROMETRY
Filed March 28, 1938  7 Sheets-Sheet 7

INVENTOR.
Raymond C. Machler
BY
Cornelius L. Eckert
ATTORNEY.

Patented Aug. 12, 1941

2,252,015

UNITED STATES PATENT OFFICE 2,252,015

OPTICAL PYROMETRY

Raymond C. Machler, Philadelphia, Pa., assignor to Leeds & Northrup Company, Philadelphia, Pa., a corporation of Pennsylvania Application March 28, 1938, Serial No. 198,450

23 Claims. (Cl. 88—22.5)

My invention relates to methods of and apparatus for optical-pyrometry of the character in which the temperature of an incandescent object under black or non-black body conditions is determined by match of observed brilliance thereof with the observed brilliance of an incandescent body of known temperature-brilliance characteristic.

In accordance with one aspect of my invention, in a system utilizing a filament or equivalent body of known temperature-brilliance characteristic, temperatures of objects under black body conditions are readable directly from a scale, which may be calibrated in units of temperature, and from the same scale may be directly read true temperatures of objects under non-black body conditions.

In accordance with another aspect of my invention, when the body of known temperature-brilliance characteristic is a filament, or equivalent, directly or indirectly heated by electric current, the filament heating current traverses a potentiometer resistance to produce across it a related difference of potential which is balanced against the voltage of a standard cell or equivalent, and with an adjustable balancing element there is associated a scale preferably calibrated in units of temperature for directly reading therefrom the temperature of the object, or for setting the brilliance of the filament, or equivalent, corresponding with any selected temperature, as a guide for changing the temperature of an object to bring it to equality with aforesaid selected temperature.

Further in accordance with my invention, to prevent departure of the electromotive force developed by the standard cell from its constant or standard magnitude, because of excessive current through the cell, the relation to each other of the magnitudes of resistance of the rheostat controlling the heating current and of the potentiometer resistance is such that for equal or proportional extents of movement of the adjustable elements of the rheostat and potentiometer resistance there is, throughout the range of adjustment of these elements, never more than a slight and inconsequential flow of current through the standard cell. Preferably, to this end and to facilitate rapid measurements, the adjustable elements of the rheostat and the potentiometer resistance are coupled for movement in unison during procurement of the aforesaid match of brilliances, and are decoupled when the potentiometer resistance is thereafter adjusted, without change of the setting of the heating current rheostat, to procure balance of the voltages of the potentiometer and the standard cell.

In accordance with my invention, there are established such relations between the total circuit resistance, the potentiometer resistance, and the voltages of the standard cell and the source of heating current, that throughout the useful life of the source of heating current there are maintained those circuit conditions which insure that concurrent movement of the adjustable elements of the rheostat and potentiometer resistance will, as aforesaid, minimize the current flowing through the standard cell when it is brought into circuit for balancing the potentiometer voltage.

My invention further resides in the methods and features of construction and arrangement hereinafter described and claimed.

For an understanding of my methods and for illustration of some of the forms my apparatus may take, reference is to be had to the accompanying drawings, in which:

Fig. 1 diagrammatically represents the optical and electrical components of a complete optical pyrometer system;

Fig. 1a diagrammatically represents a modification of the filament or body of known temperature-brilliance characteristic;

Fig. 1b is a plan view on greatly enlarged scale of aforesaid filament or body of Fig. 1a;

Figs. 2 and 2a are curves referred to in description of the system of Fig. 1;

Fig. 3 is a perspective view of the telescope and control box of the optical pyrometer system of Fig. 1;

Fig. 4 is a perspective view of the reverse side of the cover of the control box of Fig. 3 and of the mechanism attached thereto;

Fig. 5 is a sectional view taken on line 5—5 of Fig. 4;

Fig. 6 is a detail view, in section, taken on line 6—6 of Fig. 4;

Fig. 7 is a fragmentary sectional view, partly in elevation, of parts within the control box;

Fig. 8 is a perspective view of an air filter shown in Fig. 7;

Fig. 9 is a longitudinal sectional view, partly in elevation, of the pyrometer telescope shown in Fig. 3;

Fig. 10 is a sectional view taken on line 10—10 of Fig. 9;

Figure 23:
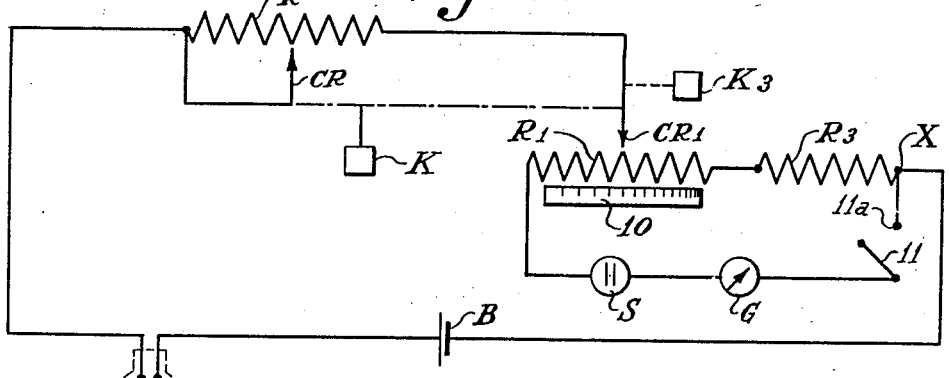
Figure 24:
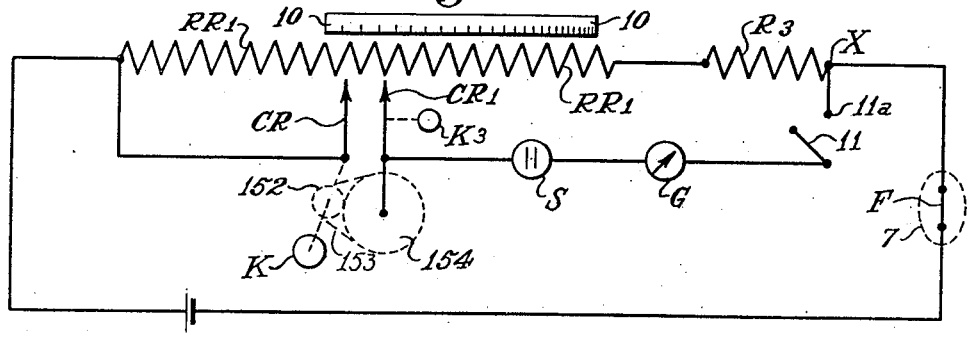

Fig. 11 diagrammatically represents another measuring system utilizing mechanism shown in Figs. 5 and 6;

Fig. 12 illustrates a modification of parts appearing in Fig. 10;

Figs. 13 and 14 illustrate absorption screens;

Figs. 15 to 17 diagrammatically illustrate various types of optical pyrometer systems, more especially suited to measurements under "non-black" body conditions;

Figs. 18, 19 and 20 diagrammatically illustrate optical pyrometer systems modified for measurements under "non-black" body conditions;

Figs. 21 and 22 illustrate temperature scales and emissivity correction scales utilized therewith;

Figs. 23 and 24 are modifications of the circuit of Fig. 1.

The optical pyrometer system shown in Fig. 1 comprises a telescope 1 which is sighted by the observer upon the hot body or object whose temperature is to be measured and a control box 2 containing the auxiliary electrical apparatus. One of the optical adjustments effected by the operator involves movement of the eye piece comprising the lenses 3 and 4 to bring clearly into focus the filament F, of any suitable form, of lamp 7 within the telescope housing, and the other optical adjustment involves movement of the objective lens 6 to bring the image of the hereinafter mentioned furnace aperture or object (of black or non-black body emissivity) under observation into the plane of the filament F, which itself may be flat or in the form of a very small ribbon, with its flat surface normal to the direction of vision or optical axis of the telescope, and may be of tungsten or other suitable metal or material. After these adjustments have been made, the operator lights the filament of the lamp 7 and adjusts the current through it until it is not distinguishable in brilliance from that of the hot body under observation. Specifically, to effect this optical match, the operator closes the switch comprising the contacts 8, 9, to complete a circuit comprising the filament battery B, the filament rheostat R, a potentiometer or voltage-divider (which, in the preferred arrangement of Fig. 1, comprises slidewire R1, an end-coil resistance R3 in series therewith, and a resistance R2 in shunt to slidewire R1) and the necessary connections between these elements and the lamp 7. The brightness of the lamp filament is then varied by adjustment of the rheostat contact CR, which introduces more or less resistance in circuit in series with the filament F to decrease or increase its brilliance as the angle $\beta$ is increased or decreased to vary in magnitude the short-circuited or ineffective section of the rheostat.

When the optical balance or match has been made, there exists between the terminal X of potentiometer resistance R3 and some point on the potentiometer slidewire R1 a difference of potential or voltage drop which is equal to the electromotive force produced by standard cell S of any desired type. The temperature of the observed object is ascertained, after the optical match has been made as aforesaid, by adjustment of voltage-dividing contact CR1 along the potentiometer slidewire R1 until there is no deflection of the galvanometer G in circuit with the standard cell S which is temporarily connected through switch 11, 11a for balancing purposes between the terminal X of resistance R3 and the adjustable contact CR1 of the potentiometer slidewire R1. Galvanometer G is preferably of a type capable in the system described of affording an observable deflection when 1 milli-volt is applied therein. When electrical balance has been attained, the temperature of the observed hot body may be determined or read from scale 10 associated with an index movable with the adjusting element CR1 of the potentiometer.

From the following more complete discussion, the circuit relations necessary to procure the aforesaid results will become apparent.

For each particular magnitude of current $i$ through the lamp filament, the filament has a definite resistance $R_F$. The general equation for the filament current $i$ may therefore be written:

(1) $$i = \frac{E_B}{\beta R + \frac{R1 R2}{R1 + R2} + R3 + R_F + R_B}$$

in which $E_B$ = voltage (nominal) of filament battery B
R = total resistance of filament rheostat
$\beta$ = displacement from terminal $r$ of rheostat contact expressed as a fraction of its normal range of movement
R1 = total resistance of potentiometer slidewire
R2 = total resistance of slidewire shunt R2
R3 = resistance of potentiometer end coil R3
$R_F$ = filament resistance
$R_B$ = internal resistance (nominal) of battery B.

[The nominal filament battery voltage $E_B$ aforesaid may be or is such as measured by a voltmeter which is traversed by current from the battery of such small magnitude as to cause at most inconsequential error in the voltage reading, the battery itself being fresh or at worst not sufficiently exhausted to preclude its delivery of the maximum filament current corresponding with the maximum temperature to be measured. And the nominal internal resistance $R_B$ aforesaid of the filament battery B is that of a new or fresh battery or in any event one not sufficiently exhausted to preclude delivery thereby of aforesaid maximum filament current.]

When the slidewire contact CR1 has been adjusted to obtain null deflection of galvanometer G, the voltage drop between terminal X of resistance R3 and the potentiometer slidewire contact CR1 is equal in magnitude to the voltage of the standard cell S; therefore the relations between the filament current, the standard cell voltage and the potentiometer resistances may be expressed by the equation:

(2) $$i = \frac{E_S}{\alpha \frac{R1 R2}{R1 + R2} + R3}$$

in which $i$ = filament current
$E_S$ = standard cell voltage
$\alpha$ = displacement of the potentiometer contact from junction of R1, R2 and R3 expressed as a fraction of normal range of movement
R1, R2, R3 are the same as in Equation 1.

From Equation 2, it appears: that the maximum measurable magnitude of current $i$ is determined by the magnitude of resistance of the end coil R3; because when $\alpha = 0$, (3) $$E_S = R3 \cdot i_{(max)}$$

and that the minimum current for which a temperature reading can be observed is determined by the total resistance of the shunted potentiometer slidewire R1 plus the resistance of the end coil R3; because when $\alpha = 1$, (4) $$E_S = i_{(min)} \left( \frac{R1 R2}{R1 + R2} + R3 \right)$$

To make the scale 10 associated with the potentiometer direct reading in temperature, it is necessary to know the current-temperature calibration of the lamp 7 (for example curve L, Fig. 2a); if, by way of explanation, the scale 10 is to read from 1400° to 2250° F., the currents through the lamp filament when its brilliance matches that of an object or objects at, for example, true temperatures of 1400° F. and 2250° F., are determined, and then, from Equations 3 and 4, for the aforesaid maximum and minimum temperatures, there may be computed the values of the potentiometer resistances. The other points of the temperature scale 10, for temperatures intervening between aforesaid maximum and minimum temperatures, may then be located thereon by solving for $\alpha$, in Equation 2, when to $i$ there is assigned the various values known from aforesaid calibration curve of the lamp to correspond to definite temperatures.

For reasons hereinafter appearing, the slidewire R1 is uniform in cross section and therefore for equal adjustments of the slidewire contact CR1 throughout its range of movement, the potentiometer voltage between contact CR1 and terminal X varies by equal increments.

Assuming scale 10 shall read from 1400° to 2250° F., and that the magnitudes of the filament currents corresponding to those temperatures are about 30 milliamperes and 60 milliamperes respectively, and that the voltage of standard cell S is 1.019 volts (Eppley unsaturated standard cell), the circuit constants as computed from the equations above are—slidewire R1, unshunted, about 40 ohms; potentiometer end coil R3 about 15 ohms; and slidewire shunt R2 about 120 ohms.

The effective resistance of slidewire R1 shunted by R2 is about 30 ohms (in series with R, B, F, R3) and these elements therefore may be replaced by a slidewire having by itself that resistance; however, the use of the shunt R2 is desirable because it permits, without recalibration of the scale, adaption of the circuit to filaments having temperature-current curves L, L1, L2, Fig. 2a, coincident at the high end of their range but of somewhat different slopes merely by replacement of any one shunt R2 by another of suitably different resistance, or by connecting in parallel with R2 another resistance of such magnitude that the combined shunt value of R1, R2 and the added coil suits the particular temperature-current characteristic of the lamp to be used.

When the magnitudes of the potentiometer resistances (R1, R2, R3) have been determined, the proper magnitude of resistance for the filament rheostat R is calculated from Equation 1. Because the rheostat must be capable of reducing the filament current at least to a minimum value corresponding to the lowest temperature to be measured, even when the filament battery B is new or fresh, the value assigned to $E_B$ in Equation 1 should be the maximum voltage of a new battery, and to its internal resistance $R_B$ should be assigned the minimum value corresponding to the then low internal resistance.

Assuming the particular circuit constants above given, battery B to comprise four cells in series (for example four No. 950 Eveready cells), and resistance of the filament F to be approximately 22 ohms at about 1400° F., the maximum resistance of rheostat R ($\beta=1$) should be about 200 ohms.

Since a standard cell is not capable, without substantial impairment of its value as a voltage standard, of supplying even small amounts of current for more than short intervals of time, there is provided in the control box 2 the switch 11, 11a which is closed only during the balancing of the potentiometer voltage against the standard cell voltage. Moreover in the particular arrangement shown, the standard cell circuit also includes a second switch 9, 12 which is closed only after the operator has closed the filament circuit switch 8—9. Because both switches (11, 11a and 9, 12) must be closed to complete the standard cell circuit, the possibility of damage to the cell by prolonged accidental closure of its circuit is minimized.

The accuracy of the temperature measurements depends upon the constancy of the voltage of the standard cell S which is adversely affected if the current flowing from or to the standard cell S is larger than a very small value, for example 100 microamperes. It is therefore necessary for high accuracy that before switch 11, 11a is closed, the potentiometer slidewise contact CR1 be so near the position for which balance of galvanometer G obtains that when switches 11, 11a, and 9, 12 are closed the amount of current flowing in either direction through the standard cell S does not exceed 100 microamperes and is preferably much less.

This result is insurable, in accordance with my invention, by so relating the positions of the contacts CR and CR1 with respect to each other, whether or not they be mechanically coupled as hereinafter described, that the unbalance of the potentiometer circuit, i. e. the difference between the voltage of the cell S and the fall of potential between the point X and the contact CR1 upon closure of switches 9, 12 and 11, 11a, is always insufficient to cause flow in either direction through the cell S of a current of magnitude which to any substantial degree affects the constancy of voltage of that cell. When the contacts CR and CR1 are not mechanically coupled to each other, the aforesaid limit of unbalance of the potentiometer circuit may be prevented either by memory of suitable positions of these contacts with respect to each other or by distributing along the paths of CR and CR1 suitable markings for identification of several or various simultaneous settings of contacts CR and CR1 which will afford approximation to potentiometer balance close enough to prevent aforesaid excess current through cell S.

However, more particularly and preferably, the adjustable contacts CR and CR1 may be and are mechanically coupled to each other as indicated at Mc, more particularly hereinafter described, so that both may be moved simultaneously by a single knob, such as K, Figs. 3 and 5, and so are moved through angles $\alpha$ and $\beta$ which are always equal, or, and in general, proportional to each other. And the contacts CR and CR1, for either of these instances of mechanically coupling them, insure that upon closure of the standard cell circuit at switches 11, 11a and 9, 12 the potentiometer unbalance will not exceed that which is permissible within the limits above described. Accordingly the coupling of the adjustable contacts CR and CR1 has the dual aspect of single-knob operation and that of prevention at any time of unbalance of the potentiometer sufficient adversely to affect the necessary constancy of voltage of standard cell S.

The angular adjustments of the rheostat and slidewire contacts CR and CR1 may be made equal or proportional, as aforesaid, by selecting the magnitudes of the resistances R and R1 in manner hereinbefore explained, and, in addition, by so constructing resistor R and potentiometer resistance R1 that like or proportional extents of movement of contacts CR and CR1 effect the same percentage change of total rheostat resistance and total potentiometer resistance between X and r1.

In general, however, whether or not contacts CR and CR1 are mechanically coupled for either like or proportional adjustments, and in further explanation, referring to Fig. 2, curve $a$ shows the relations between the settings of slidewire contact CR1 and the various magnitudes of filament current which must exist to effect balance with the voltage of the standard cell; and curve $b$ shows the relations existent between the settings of the contact CR of the filament rheostat and the filament current when the filament battery B is new. From Fig. 2 it is apparent that when the contacts CR and CR1 have the same angular positions $(\alpha=\beta)$, or are proportionately displaced, the unbalance of the potentiometer is within the range of from about 2% to 5% corresponding to current through the standard cell of from about 40 to about 100 microamperes. When, however, the contact CR1 has been adjusted independently of CR to effect balance for a particular value of filament current, then for any subsequent adjustment of the rheostat contact CR and a similar equal or proportional adjustment of contact CR1, the unbalanced current through the standard cell (whose circuit is closed only after both of these adjustments have been made) is not greater than about 25 microamperes.

The preferred operating procedure therefore is to adjust rheostat contact CR to match the brilliance of the filament with the brilliance of the observed object, then to move the slidewire contact CR1 the same or a proportional extent that it was necessary to move the rheostat contact CR, then to close the switch 11, 11a and make the further slight adjustment of contact CR1 necessary to obtain null deflection of galvanometer G.

After long use of the filament battery, the curve $b$ gradually falls and approaches curve $b^1$ (Fig. 2), illustrative of the relations between the rheostat settings and the filament current when the battery B has reached the end of its useful life. However, even at this time, when the above preferred procedure is followed, the current through the standard cell at the beginning of the balancing operation is not more than about 80 microamperes.

When the pyrometer is used to ascertain when a hot body reaches a certain temperature, the preferred procedure to be followed to insure low and harmless current through the standard cell is slightly different from that above described. In brief, the operator, while the standard cell switch 11, 11a is open, first sets the potentiometer slidewire contact CR1 to the scale setting corresponding to the desired temperature and adjusts the rheostat contact CR to like or proportional extent; thereafter switch 11, 11a is closed and a further slight adjustment of the rheostat contact made until there is no deflection of galvanometer G. The operator now knowing that the filament current corresponds to the desired temperature, opens the switch 11, 11a and while the switch contacts 8, 9 are still closed, observes the object. As soon as the brilliancy of the object matches the predetermined brilliancy of the filament, the operator knows the object has arrived at the temperature corresponding to the setting of CR1 with respect to scale 10.

An important advantage of the potentiometric optical pyrometer of Fig. 1, and others herein subsequently described, characterized by balance of a voltage drop due to the pyrometer lamp current against a known voltage, is that the temperature scale 10 is more open at the low end of the temperature range than at the high end thus to afford substantially constant accuracy of readability throughout the range of the instrument; in the particular arrangement of Figs. 1 to 10, the scale in fact follows or closely approximates such law that for successive small equal increments of displacement along the scale, the ratio of the difference of the temperatures at the beginning and end of each displacement to either of those temperatures is substantially a constant throughout the range of the scale.

The optical pyrometer system shown in Fig. 1a is generally similar, electrically, to that of Fig. 1, and differs in that the incandescent element or body F', of known temperature-brilliance characteristic, of the pyrometer lamp is indirectly, instead of directly as in Fig. 1, heated by heater H traversed by current from battery B or other source of current. The element F' of any suitable metal or material, may be tubular, preferably flattened, as shown on enlarged scale in Fig. 1b, to simulate the flat filament F of Fig. 1; and within it is disposed the heater resistance H. The brilliance of the element F' is variable by adjustment of rheostat contact CR which controls the magnitude of current from source B traversing the heater H and therefore controls the temperature and brilliance of element F'.

For every different magnitude of heater current, there is established by flow of the heater current through the potentiometer resistances R1, R2, R3, a difference of potential between points X and r1, and for each magnitude of this potential difference, there is one position of contact CR1 which effects balance between the voltage of the standard cell S and the difference of potential between point X and the contact CR1. Therefore, as in the system of Fig. 1, the position of contact CR1 at balance is a function of the temperature of the element F', which temperature is controlled by the operator to effect match of the brilliance of that element with the brilliance of the object whose temperature is to be determined. The procedures of manipulation of the apparatus of Fig. 1a to determine an unknown temperature or to ascertain when an incandescent body attains a known temperature are the same as above described in connection with Fig. 1.

For brevity, the term "filament" appearing in the appended claims is used generically, when not inconsistent with the context, to comprehend an element heated to incandescence by passage of current therethrough, an element raised to temperatures of incandescence by transfer of heat thereto from a resistor or equivalent traversed by current, or an element otherwise electrically heated directly or indirectly by an electric current, and in all cases having known or predetermined temperature-brilliance and temperature-current characteristics.

The mechanical construction and mechanical details of the optical pyrometer system of Fig. 1 are shown in Figs. 3–10. Referring to Fig. 3, the control box 2 in which are enclosed the rheostat R, slidewire R1, standard cell S, galvanometer G and filament battery B, is provided with a strap 13 which permits the box to be suspended from the neck of the observer and rest aga'nst his body above the waist in position where the knob K is accessible, and the pointer of the galvanometer G and the temperature scale 10 are easily observed through the windows 14, 15 in the top of the box 2. The conductors extending from the control box to the telescope 1 are enclosed within a suitable flexible cable 16 and within the telescope housing connect to the switch contacts 8, 9, 12 and the filament F of the lamp 7.

As more clearly shown in Fig. 9, the switch operating member 17, which engages the palm of the operator's hand when his fingers fit in the ribbed portion 18 of the telescope housing, is pivoted at 19 to the housing 1 and is restrained from outward movement by the stop 20. When the operator closes his hand upon the housing and member 17, the upward movement of the latter first effects engagement of the contacts 8 and 9 to close the filament circuit, and continued upward movement of member 17 effects closure of contacts 9 and 12 in series with switch 11, 11a in the standard cell circuit. By this construction, the operator with the same hand used to hold the telescope can readily open and close the filament circuit without losing view of the object under observation and with the other hand can operate the knob K of the control box to adjust the brilliancy of the filament F.

The objective lens 6 is secured within the member 21 having a knurled end K1 extending beyond and outside of the telescope housing for adjustment by the operator to bring the image of the object under observation into focus in the plane of the lamp filament. The member 21 is exteriorly threaded and received by the rotatable range-selecting member 22. The adjustment of the objective lens 6 is not affected when the member 22 is rotated to bring one or the other of apertures 23, 24 of plate 25 into line between the lens 6 and the rest of the optical system. To the inner end of member 22 is secured the plate 26 having notches 27, 28 for alternatively receiving the spring pressed pawl or click 29 when plate 26 is in one or the other of its two positions for which the apertures 23, 24 are in proper alignment with the lens system of the telescope. The plate 26 also serves as a shoulder definitely locating the axial position of member 22 and therefore of lens 6. The plate 25, pivotally mounted upon pin 25a extending from the rotatable member 22, is provided with a slot 30 for receiving the stationary pin 31 extending from the housing member 1a of the telescope. As member 22 is rotated from left to right, the plate 25 rotates from right to left and vice versa to bring the desired aperture 23 or 24 into line with the lens 6.

The lens system of the eye piece is carried by the elongated cylinder 32 slidable in suitable openings 33, 34 in the main member of the telescope housing; for at least a portion of its length the cylinder 32 is threaded and receives the adjusting knob K2 which, as appears in Fig. 3, in part projects outside of the housing for adjustment by the operator during observation. Preferably, the eye piece includes a filter 3a, which passes only substantially monochromatic light, preferably red, thus to avoid errors arising from the variation in color sensitivity of different individuals. The cylinder 32 is prevented from rotating during this adjustment by the pin 36 which engages a slot 37 extending longitudinally of the cylinder near its inner end. Movement of the adjusting knob K2 axially of the telescope is prevented on one hand by the shoulder 38 of the telescope casing and on the other hand by the plate 39 held against the end of the housing by the nut 40 which also serves to press the resilient, friction member 41 against the eye-shade 42, preferably of soft flexible rubber. The position of the eye-shade with respect to the telescope may readily be changed to permit use of either the left or right eye or use of the telescope in any desired angular relation with respect to the eye-shade.

The cylinder 32 also serves as a support for the two diaphragms 3b; the diaphragm 3c is attached to or forms part of the tube 22.

The herein described filaments may be of any suitable material, type and construction, so long as serviceable for the purpose of my present invention as standards of definite or known temperature-brilliance characteristic. However, of especial suitability for the methods and apparatus herein described is a thin, flat filament having proportions, characteristics and advantages of the filaments described in my copending application Serial No. 196,137, filed March 16, 1938 (Patent No. 2,176,087, issued Oct. 17, 1939); more particularly, by way of example, filament F may be of tungsten, flat, one inch long, about .002 inch wide and about .0002 inch thick; and the structural features and characteristics of the lamp, of which the filament is a part, to advantage may be those of the lamp described in aforesaid application; it being understood, however, that my present invention is not limited to filaments and lamps of the character in said copending application described.

For convenience of the operator in following the preferred procedure which insures limitation of current through the standard cell, there is provided a clutch mechanism, Fig. 5, between the adjustable contacts CR and CR1. The knob K is secured as by screw 43 and pin 43a to the shaft 44 supported by the bearing plate 45 suitably secured, as by bolts 46, to the cover 47 of control box housing 2. To the shaft 44 is attached, as by pin 48, the arm 49 having secured thereto a strip of insulation 50 to which is attached the rheostat contact CR for engaging the stationary resistance R disposed about the circumference of the disk 51, suitably attached to the bearing plate 45, concentric to the axis of shaft 44. Integral with the arm 49 is a cylindrical section 52 whose right-hand edge, Fig. 5, frictionally engages the stationary cylindrical extension 53 of the aforesaid bearing plate 45. Preferably the contacting surfaces of either or both of the members 52 and 53 are surfaced with cork or other material having a suitable coefficient of friction to hold contact CR in any position to which it is adjusted by knob K.

The other edge of the cylindrical member 52 frictionally engages the adjacent edge of the cylindrical member 54 having a hub 55 through which the shaft 44 freely extends. The spring 56 compressed between the nuts 57 on the inner end of shaft 44 and the shoulder 55A of hub 55 maintains frictional engagement between the cylindrical member 52 attached to shaft 44 and the cylindrical member 54 sufficient to cause the latter to rotate with knob K but yet to be free to be rotated with respect to shaft 44 and member 52 to permit the within described adjustment of contacts CR and CR1 with respect to each other. The coacting surfaces of the members 54 and 52 preferably engage an intermediate member comprising or surfaced with cork or other material having a suitable coefficient of friction. The frictional engagement between the member 52 rotatable with shaft 44 and the stationary member 53 is maintained by the spring 58 compressed between the stationary bearing plate 45 and the shoulder 59 provided by the hub of the adjoining knob K.

From the cylindrical member 54 there extends the arm 60 to which is secured a strip 61 of insulating material which carries contact CR1 for engagement with the slidewire R1 disposed about the periphery of the stationary disk 51.

To the member 54 is also secured as by screws 54a the drum member 62 upon whose periphery, as more clearly appears in Fig. 4, is the temperature scale 10 visible through the window 15 of the control box 2. The L-shaped structure 64 secured to the disk 51 and extending over the periphery of the drum 62 is provided with an aperture across which extends the scale index member 65 visible through window 15.

Referring to Figs. 3 and 6, the knob K3, projecting outwardly from the cover 47 of the control box, is suitably attached to the shaft 66 supported by the bearing 67 in the cover plate 47. To the inner end of shaft 66 is attached, as by screw 68, the friction disk 69 biased, as by spring 70, normally to maintain the friction wheel 69 out of contact with the rim of the scale drum 62. When knob K3 is pushed inwardly, it effects engagement between the contact surfaces of drum 62 and wheel 69 to permit upon rotation of knob K3 rotation of the scale drum 62 and the contact CR1; this rotation of drum 62 and contact CR1 does not affect the setting of contact CR because the frictional moment of 52—54 is less than the frictional moment of 52—53.

When knob K3 is pressed inwardly, it also effects closure of the switch 11, 11a in the standard cell circuit. Specifically, to the contact member 11 is attached the strip 72 of insulation which bears against the face of the washer 73 on shaft 66 so that spring 70 is normally effective to maintain separation of the contact members 11 and 11a. When, however, knob K3 is depressed, the resiliency of the contact member 11 effects its own movement into engagement with the cooperating contact member 11a to close the standard cell circuit assuming the operator maintains engagement of contacts 9, 12 of the telescope switch by pressure upon member 17. The contact member 11 is suitably secured as by screws 74 to a block of insulation 75 suitably attached to the rear face of cover 47.

In the arrangement shown in Fig. 5, the slidewire contact CR1 is operated directly from the shaft to which the operating arm of contact CR is attached; however, and particularly when the factor of proportionality between the extents of adjustment of contacts CR and CR1 should or desirably may be other than unity to preserve the relations ensuring the aforesaid close approximation of balance for the various positions of CR and CR1, these contacts may be coupled as by gearing or other mechanism, exemplified in Fig. 24, ensuring that for every change in position of contact CR, the slidewire contact CR1 will concurrently move to an extent, different from but either proportional or disproportionate to the extent of movement of CR, to that position for which the potential drop between point X and contact CR1, Figs. 1 and 1a, will approximate or equal the standard voltage of cell S.

In brief description of the operation of the specific form of the apparatus shown in Figs. 3 to 10: the operator while pressing switch member 17 views through the telescope the object itself under "non-black body conditions" or an aperture of a furnace, for example, in which the body may be under "black body conditions," both hereinafter more particularly referred to, and adjusts the knob K of the control box until the brilliancy of the filament matches the brilliancy of the object or furnace aperture; this movement of knob K not only adjusts the rheostat contact CR for that purpose, but also, because of the frictional engagement between the members 52 and 54, adjusts to like extent the contact CR1 of the potentiometer. It is thus insured, for reasons discussed above, that when the standard cell circuit is closed, the difference of potential between the slidewire contact CR1 and the point X of the potentiometer circuit shall be at least approximately equal to the standard cell voltage. After the operator has effected the optical balance, and while continuing to press the switch operating member 17 of the telescope, knob K3 is pushed inwardly to effect closure of the standard cell circuit and to engage the drum 62, and is then rotated to effect, vernier fashion, the slight additional adjustment of the slidewire contact CR1 necessary to obtain perfect balance, as indicated by null deflection of the galvanometer G, of the standard cell and slidewire voltages. During this adjustment of knob K3 the rheostat contact CR remains in its position, to which previously adjusted, by virtue of the frictional engagement between the cylindrical member 52 and the stationary member 53.

To set the apparatus to a predetermined temperature for ascertaining when a hot body arrives at that temperature, with the particular form of my invention illustrated, the procedure is slightly different. The scale drum 62 is set to the desired temperature by adjustment of knob K and the knob K3 then depressed; if the galvanometer deflects knob K3 is rotated to effect null deflection or balance, and then knob K is readjusted to bring the drum 62 back to position of scale indication corresponding with the desired temperature. It may be necessary to effect this sequence of operations several times to satisfy concurrently the condition of proper scale setting and zero deflection of the galvanometer. If the instrument is to be used exclusively or predominantly for this type of work, the positions of the rheostat R and slidewire R1, in Fig. 5, should be interchanged, in the sense that resistances R and R1 be interchanged in their position on disk 51 and that contact CR be carried by member 60 and CR1 by member 49, the circuit relations and connections remaining as in Fig. 1, so causing contact CR to be adjustable by knob K3 independently of CR1; whereby drum 62 may be set directly to the desired temperature without need for a series of trials or approximations. With the construction so modified, however, it is then necessary to use the more involved procedure of a series of approximations when using the apparatus to measure an unknown temperature.

When the resistances and contacts are so interchanged, it will be understood that rheostat R will be, of the resistances R and R1 in Fig. 5, the one nearer to the cover 47 and that its contact CR will be carried by the arm 60 of drum 54 and that potentiometer resistance R1 will be the resistance more remote from cover 47, Fig. 5, and its contact CR1 will be carried by arm 49 attached to drum 52.

By rendering member 54 at all times free of engagement with member 52, contacts CR and CR1 will be at all times free of each other, causing and permitting their adjustment individually and independently of each other by knobs K and K3 respectively; whereby any of the preferred procedures described in connection with Fig. 1 may be performed; with contacts CR and CR1 so individually adjustable entirely independently of each other, the operator should, after each adjustment of one or the other of knobs K, K3, move the other knob to an equal angular extent and in the same sense before he effects closure of the switch 11, 11a.

The scale drum 62 is preferably provided with slots 76 permitting it to be adjustably secured to the member 54 in various angular positions with respect to the potentiometer contact CR1. It is thus possible to reset the scale for accurate temperature readings when, for one reason or another, the lamp 7 is replaced by another of different temperature-current characteristic of similar slope but having a different intercept of axis or axes of coordinates. The lamps are each preferably marked with a number corresponding to the markings on the scale 77 attached to the scale drum 62, Figs. 4 and 5, so that without change in or recalibration of the temperature scales 10, the apparatus is suited for a new lamp merely by setting the pointer 78, having fixed position with respect to the contact CR1, to the marking on scale 77 corresponding with the number of the substituted lamp. So long as the slopes of the current-temperature characteristics of the different lamps are similar, no further adjustment of the apparatus is necessary to suit it for use with different lamps. When the current-temperature characteristics of the lamps do not have the same slope, the need to recalibrate the temperature scales 10 can be avoided by changing the resistance of the shunt coil R2 of the potentiometer.

In the particular instrument of Figs. 3 to 10, as most clearly appears in Fig. 4, the temperature scale 10 comprises a low range scale 10A of from say 1400° to 2250° F., and a high range scale 10B, of from say 2200° F. to 3200° F., whose range of temperatures desirably overlaps to appreciable extent the compass of the low range scale. For determination of temperatures within the low range, the knob K4 of the telescope is so set that aperture 24 in plate 25 (Fig. 10) is in line with the axis of the telescope; because aperture 24 is devoid of any absorption screen, the filament brilliance, for low range temperature measurements, is made substantially equal to the brilliance of the body under observation. For reading of temperatures within the high range, knob K4 is reset to bring aperture 23 of plate 25 into alignment with the axis of the lenses; within aperture 23 is a glass absorption screen 23a (Fig. 9), preferably of Corning "Reannealed pyrometer brown," of suitable spectral absorption and thickness. By recourse to an absorption screen, it is not necessary in measurement of high temperatures to operate the lamp filament F at excessively high temperatures in order to obtain optical match of the filament brilliance with the brilliance of the image of the incandescent body under observation.

The high range scale may be, and generally is as herein more particularly understood, calibrated by comparing the brilliance of the filament with the brilliance, observed through screen 23a, of a black body at known temperatures.

The observer in reading temperatures from the scale drum 62 must, of course, take into account the setting of knob K4, and read the high or low range scale accordingly.

Since the film or dust on the screen 23a or lens 6, or on at least the front (right Fig. 9) surface 7a of the lamp bulb 7, undesirably functions as an absorption medium of indiscriminate absorption factor, it is important the surfaces of 23a, 6, and 7a be maintained clean; and to facilitate cleaning of surfaces of 23a and 7a the housing is made separable at plane z—z, indicated in Fig. 9, where, by removal of the front section 1a of the telescope housing, those surfaces are exposed; for cleaning lens 6, the tubular member 21 is removed from section 1a. The separation of the housing at plane z—z also facilitates replacement of lamp 7, particularly when there is utilized the preferred lamp mounting more fully disclosed in my aforesaid application.

Since optical pyrometer systems are usually employed in locations where the air is contaminated with dust and fumes, the control box 2 should be and is sealed against atmosphere. The cover 47 is clamped tightly against the body of the box and preferably to obtain a good seal there is interposed between the cover and the box (Fig. 5) the gasket 47B of rubber or other suitable material. However, since apparatus of this type is also subjected to widely different temperatures, provision is made to allow air to flow into and out of the box 2. To permit the box to breathe without contamination of the air in contact with the electrical equipment within the box, there is provided a filter comprising a housing 79, Figs. 7 and 8, suitably secured to the interior of the control box in alignment with the opening 80 through the side of the box. The air entering the housing through the opening 80 must pass through the disk 81 of filter paper and the fine mesh screen 81a suitably held to the housing as by the clamping ring 83. To prevent fine particles of iron or other magnetic material from entering the housing and clogging the pores of the filter 81, there may be provided the plug 82, Fig. 7, which extends into the passageway between the interior of the housing and the opening 80 in the box, and which is provided with a slot through which the air must pass before entering the housing. The plug 82 is magnetized to attract and hold any iron particles which may be moving with the air stream entering the box.

The plug 82 may be unscrewed through the opening 80 of the control box from time to time and freed of the accumulation of iron dust. By providing plug 82, and for its removal as described, it is necessary less frequently to open the control box for renewal of the filter 81.

The standard cell S, one-half of which appears in Fig. 7, is suitably held against a resilient body such as the plate 84 of sponge-rubber, preferably in such angular relation that it remains operative whether the control box be used in the vertical position shown in Fig. 3, or with the knob K on top.

The two halves of the standard cell S may be held against the plate 84 by the strip 85 of copper or the like, which also serves to equalize the temperatures of the electrodes of both halves, and the plate 84 is positioned by one or more angle brackets 85a secured to the filter housing and by screws 86 to the backing plate 87 for the resilient mounting 84

The arrangement shown in Fig. 5 for coupling the adjustable elements of several impedances for effecting their adjustment in unison by one operating member, and for decoupling them for adjustment of one of them by another operating member may be utilized to advantage in networks other than the optical pyrometer systems. Whether the impedances so coupled by a disengageable mechanical connection be of substantially pure resistance having negligible inductance or capacity, or whether one or both of them be of substantial inductance or capacity, depends upon the nature of the network and whether the current utilized therewith is a direct current, or an undulatory or periodically varying current. For example, in the network shown in Fig. 11, the voltage drop across all or a part of the resistance P is opposed to an unknown voltage such as that produced by a thermocouple T. The current flowing through resistance P is varied by adjustment of the rheostat contact CR until there is no deflection of galvanometer G1, and the magnitude of current flowing through resistance P is measured by balancing the voltage of a standard cell S against a voltage drop produced by flow of the current through slidewire R1. Specifically, the standard cell S is connected in circuit between the terminal X and contact CR1 of the slidewire, and with the adjustable contact there is associated a scale 10 which may be calibrated in terms of voltage, current, temperature or other condition which effects the variation of the unknown voltage.

As indicated generically by the broken lines, Fig. 11, the adjustable contacts CR and CR1 are coupled for movement in unison during the adjustment of contact CR by knob K to effect balance of the galvanometer G1. It is thus insured that, when the standard cell circuit is closed by switch 11, 11a, no more than small or aforesaid negligible current will pass through the standard cell; the final balance is effected by adjustment of knob K3 which effects movement of contact CR1 independently of contact CR, all as described in connection with the clutch arrangements of Fig. 5. Knob K3 may also, as in the case of Fig. 6, be utilized to control the opening and closing of the standard cell switch 11, 11a.

The temperatures ascertained as hereinbefore described are "apparent" temperatures; they are the actual or true temperatures of the luminous or incandescent body under observation only if that body be in fact a "black body" or if the temperature measurements be made under "black body conditions."

A "black body" as herein contemplated is one having theoretically maximum emissivity, and to that maximum emissivity is customarily assigned the numerical coefficient or emissivity value of unity. All other materials, those practically exclusively met with in practice and whose temperatures are to be determined, have emissivity values or coefficients less than the aforesaid arbitrary "black body" constant, unity, and are known as "non-black bodies," which term includes "gray bodies," whose emissivity coefficients are substantially constant throughout the range of wavelengths of visible radiation, and bodies having selective radiation, whose emissivity coefficient is not the same at different wavelengths.

However, aforesaid other materials, having emissivity coefficients or constants less than unity, may have their temperatures measured under "black body conditions," which as herein contemplated are realized when the material, of less than unity emissivity coefficient, or whatever may be its emissivity coefficient or value, is, for example, disposed within an enclosure, such as a furnace chamber, whose walls or interior and said material are uniformly heated or are all at uniform temperature or in temperature or radiation equilibrium, and the pyrometer is sighted upon a small aperture in a wall of the chamber.

While a "non-black body" may be subjected as aforesaid to "black body conditions," in a furnace or the like, and its temperature determined as if it were in fact a "black body," it is frequently necessary or desirable to determine the true temperature of a "non-black body" under "non-black conditions," i. e. not under "black body conditions." The temperature of a "non-black body," when not under "black body conditions," as indicated by an optical pyrometer is its apparent temperature, which is lower than its true temperature; and in consequence corrections, different for different actual temperatures of the "non-black body," must be made; and for this purpose, when the hereinbefore described scale 10 is based on black body conditions, the same scale may be employed to measure true temperatures of "non-black bodies" by recourse to the hereinafter described procedure and structure.

The need to convert the readings of "apparent" temperatures of "non-black bodies" to "true" temperatures thereof by recourse to correction curves or tables is avoided, in accordance with my invention, by providing in front of filament F a screen ES, Fig. 1, whose transmission coefficient multiplied by the emissivity coefficient of the particular "non-black body" to be observed is equal to the transmission coefficient of screen 23a, an instrument constant on which the high range scale 10B is based. Thus true temperatures of "non-black bodies" may be read directly from that scale based on black body temperatures. For example, the emissivity coefficient of iron for radiations of wavelengths about 6500 Angstrom units (A.) (red light) is about 0.4. For direct reading of true temperatures of solid or molten iron, when outside of a furnace, non-black body conditions then prevailing, the screen ES should have a transmission coefficient of about $$\frac{K}{.4}$$

at wavelengths of about 6500 A., where K is an instrument constant; such as the transmission constant or coefficient upon which the scale is based for black body conditions.

The apparatus of Figs. 3 to 10, inclusive, may readily be modified to afford direct reading, from the same scale, of the true temperature of any non-black body of known emissivity coefficient by replacing plates 25, 26 of Fig. 10 with plates 25A, 26A of Fig. 12. When knob K4 of the telescope is adjusted to effect engagement of notch 27a in plate 26A with the ball-click or plate-positioning stop 29, the absorption screen ES in aperture 24A of plate 25A, is positioned in front of filament F, Fig. 9, to absorb part of the radiation which forms the image of the incandescent non-black body under observation. The true temperature of the non-black body (for which the absorption screen ES is selected as above described) is directly readable from the high-range scale 10B.

For direct reading of true temperatures of other non-black bodies of different emissivities, screen ES must be replaced by others respectively of proper transmission coefficients; or the plate 25A may be further modified to carry several absorption screens of different transmission characteristics selected to compensate for the differences in emissivities of particular materials. Without change in the mechanical construction of Fig. 12, the apparatus is suited for direct reading of true temperatures of two non-black body materials by use in apertures 24 and 24A of screens of proper absorption coefficients. In general, the transmission coefficient of any selected screen multiplied by the emissivity coefficient of the particular non-black body whose true temperature is to be read from the instrument scale equals a constant which is fixed for the particular instrument.

When one and the same optical pyrometer is to be used for measuring the temperatures of many different materials of different emissivities, the construction of Fig. 10 may be retained, and in addition there may be provided the calibrated emissivity-correction screen of Fig. 13 or of Fig. 14. Screen ES1 of Fig. 13 is a disk of progressively varying transmission coefficient for example, of progressively varying thickness or upon which is deposited a suitable light-absorptive coating of progressively increasing density or thickness. The axis of rotation of the disk is substantially parallel to the axis of the telescope so that as the disk ES1 is rotated in counter-clockwise direction, Fig. 13, more and more of the radiation from the observed body is absorbed by the screen, that is, the effective transmission coefficient of the screen is decreased. In the telescope of Fig. 9, the screen ES1 may be mounted to rotate in a plane normal to the axis of the telescope and between the lamp 7 and the plate 25. With the disk ES1 is associated a pointer 88 and an emissivity scale 89 to facilitate setting of the screen to suit the apparatus for direct reading of true temperatures of an incandescent body of known emissivity factor. For measurements under black body conditions, the disk is displaced from the position of Fig. 13 with its sector of low transmission coefficient in alignment with the lens system; knob K4 is in position effecting alignment of screen 23a with the lens system for measurements of temperatures within the "high range;" for measurements of temperatures within the low range screen 23a is not used. In either case, the screen ES1 is set to the position indicated by scale 89 corresponding to an emissivity factor of unity. To measure the true temperature under non-black body conditions, emissivity-correction screen ES1 is adjusted until the setting of scale 89 corresponds with the known emissivity coefficient of the particular non-black body material under observation.

The screen ES2 of Fig. 14 differs from that of Fig. 13 only in that the transmission coefficient thereof is adjustable in steps, instead of progressively or continuously. Emissivity scale 89A associated with the disk ES2 may if desired identify materials to be observed by their common names as "iron," "copper" etc. instead of, or in addition to, emissivity coefficients.

In general, and in brief, with regard to the use of the above and hereinafter described methods and apparatus for measurement of true temperatures of non-black bodies with an optical pyrometer, having a scale of true temperatures calibrated from a non-black body of known emissivity coefficient or from a black body, when that scale is destined also for determining or reading true temperatures of non-black bodies of emissivity coefficients different from the coefficient of the body upon which said scale is based, there is or are utilized a screen or screens, or equivalent structure or structures of selected transmission coefficient, in either or both of the following positions, to wit, between the body upon which the calibration of the scale is based and the eye, or between the filament or standard of brilliance and the eye. Then, with the scale so calibrated under the aforesaid conditions, to render that scale suitable and correct for reading therefrom true temperatures of various non-black bodies, there is resorted to the further step, namely, the provision and use of means which, whenever the emissivity coefficient of the body upon which the scale calibration is based is different than the emissivity coefficient of each of the various bodies whose temperatures are to be read from the scale, in effect varies the transmission proportionately, inversely or directly, depending upon position of the screen as hereinafter described.

The use of a screen of selected transmission coefficient for direct reading of the true temperatures of non-black bodies is not limited to the optical pyrometer systems previously described herein; for example, absorption screens or equivalent absorption structure may be used for that purpose, in accordance with my invention, in the several different types of optical pyrometer systems shown in Figs. 15 to 17.

Referring to Fig. 15, the adjustable absorption screen ES is disposed in front of the filament F, or equivalent, and with it is associated emissivity scale 89B to facilitate setting of the screen to the proper position corresponding to the emissivity of the material to be observed. After screen ES has been so adjusted or selected, the absorption wedge W, or equivalent, with which is associated the temperature scale 10C, is adjusted until the brilliance of the image is matched by the brilliance of filament F which, in this instance, is maintained at constant known temperature. The screen ES may be of the angularly or rotatably adjustable type shown in Figs. 13 and 14, or may be rectilinearly adjustable and in either case may be disposed in front of the temperature wedge W or between wedge W and the filament F.

Referring to Fig. 16, the optical system is so constructed that the observer simultaneously views an area illuminated by the filament F and an image of the luminous body under observation. In the particular arrangement disclosed, the absorption screen ES for compensating for differences in the emissivities of different materials is disposed between the filament F, which is maintained at constant and known temperature, and the diffuse reflector V, such as a small piece of magnesium carbonate; and the absorption wedge W, with which is associated the temperature scale 10C, is disposed between the reflector V and the objective 6; but the positions of the emissivity-correction screen ES and the wedge W may be interchanged. In either case, the screen ES is first set from emissivity scale 89B to the proper position corresponding to the known emissivity of the particular material whose temperature is to be measured under non-black body conditions, and then wedge W is adjusted until there is obtained match of the brilliancies of the object and the area illuminated by the filament. The true temperature of the object is then read directly from scale 10C associated with wedge W.

When, as in Fig. 16, the absorption or correction screen, as ES, is in a portion of an optical path between the filament F and the eye, which portion is not common to the path between the object and the eye, the proper settings of the screen are such that each selected transmission coefficient is directly proportional to the known emissivity coefficient of the body whose true temperature is to be determined. On the other hand when screen ES is in a portion of an optical path between the object and the eye, which portion is not common to the path between the filament and the eye, the proper settings of screen ES for measurements of true temperature are such that each selected transmission coefficient is inversely proportional to the known emissivity coefficient of the body or object whose true temperature is to be measured. In both instances, the relation of the proper transmission coefficient of the screen to the known emissivity of the body whose temperature is to be determined is a proportional one; direct or inverse depending upon the location of the screen.

Thus far the variation in transmission of radiation from the standard F or from the object to the eye has been described as effected by adjustment or selection of a screen, but it is to be understood the desired transmission coefficient may be obtained by other means such as polarizing mirrors and/or screens, diffuse reflectors, or by other means which by diffusion, absorption, and/or reflection effects reduction of radiation to be transmitted to the eye from the standard of brilliance or the object whose true tempertaure is to be determined.

In the system shown in Fig. 17, the absorption screen ES is disposed in front of filament F whose temperature is variable by adjustment of rheostat contact CR. The deflection instrument M, usually a milliammeter, is provided with temperature scale 10D calibrated under black body conditions. For direct reading of the true temperature of a "non-black body," the absorption screen is set to proper position, as indicated by the emissivity scale 89B, and thereafter the contact CR is adjusted until the brilliance of the filament F, or equivalent, matches the brilliance of the luminous "non-black body." The true temperature of the body is then read directly from scale 10D.

In any of the optical pyrometer systems herein described, the screen structure for compensating for differences in the emissivities of different materials may have a single transmission coefficient, as in Fig. 12, or may have a continuously or progressively variable transmission coefficient, as in Fig. 13, or may have a transmission coefficient adjustable by fixed increments as in Fig. 14; and in any particular form of the apparatus, the absorption screen may be longitudinally adjustable transversely of an optical path as indicated in Figs. 15 to 17, or may be angularly or rotatably adjustable with respect to that path, as in Figs. 12, 13 and 14. In all these cases, for a particular apparatus, the transmission co-efficient for which the screen ES is selected or adjusted is proportional to the emissivity of the body whose true temperature is to be read from the instrument scale. Otherwise stated, for any two bodies of different emissivities whose true temperatures are to be read from a scale of an optical pyrometer the ratio of the transmission coefficients effective during the measurements is either inversely or directly proportional to the ratio of the emissivities of the bodies, depending, as above noted, upon the particular optical system employed.

For brevity in the appended claims it shall be understood that, unless otherwise definitely appearing, the body or object whose temperature is to be determined and whose brilliance is to be matched by that of a filament or other standard of known temperature-brilliance characteristic, is observed under either black or non-black body conditions; that the observation is made either by viewing said standard against radiation from such body or object or its environment in temperature or radiation equilibrium therewith, or against an image thereof, or through or by way of a lens or lenses, or equivalent optical element or elements; and that the observation is made with or without screen or screens intervening between the object or body and eye, and/or with or without scren or screens between said standard and the eye of the observer. The term "filament" shall be understood broadly to refer to and comprehend standards having known temperature-brilliance characteristics.

In the systems of Figs. 15 and 16, the compensation permitting direct reading of true temperatures of bodies of different emissivities is effected by an absorption screen ES which, prior to optical match of the brilliancies of the filament and of the object whose true temperature is under determination, is set, according to emissivity scale 89B, to the position corresponding to the known emissivity of that object. In Fig. 18, screen ES or equivalent is dispensed with; the absorption wedge W is so shaped, or the absorptive coating thereon so varies in density, that its associated scale 10E of true or black body temperatures follows the law that displacement along the scale 10E from one temperature to another is proportional to the difference of the reciprocals of those temperatures expressed in degrees Kelvin (absolute temperature); and with the movable scale 10E is associated a stationary emissivity scale 89C whose markings or calibrations range, for example from 1.0 (unity) emissivity (black body conditions) through any suitable fractions of unity emissivity corresponding with various non-black body conditions under which temperature measurements are to be made. The markings of scale 89C in this instance may individually serve as proper markers or indices opposite which readings are directly taken on the main or temperature scale 10E; or the markings of scale 89C may serve to position the movable index or cross-hair 65 which then itself may be employed to read the true temperatures involved directly from the scale 10E. The scale 89C is logarithmic in character, in the sense that displacements or distances along the scale 89C are proportional to the logarithms of the ratios of emissivities corresponding with those displacements. The range of emissivities covered by the scale 89C is the range of emissivities of non-black bodies whose temperatures are in practice likely to be required. The extent of the scale 89C along or parallel to the main scale 10E, or the actual distances between its markings, is or are dependent upon the difference between the true and apparent temperatures of a non-black body; that is to say, the displacement between any two emissivity markings on scale 89C is made equal to the displacement between any two points or temperature markings on scale 10E corresponding respectively with the two different true temperatures of two bodies having the same apparent temperature but whose emissivities are different and correspond respectively to the aforesaid two markings on scale 89C. For example, suppose the emissivities of two non-black bodies are, respectively, .4 and .5; then the graduations or markings for .4 and .5 on scale 89C are that distance apart which corresponds with the distance apart on scale 10E of two different true temperatures of the two bodies having the aforesaid emissivities when at the same apparent temperature. The distance between markings .4 and .5 being thus determined, the remainder of scale 89C is readily laid out, keeping in mind its aforesaid logarithmic character.

When the instrument is sighted upon a black body, the wedge W is adjusted to effect an optical match of the filament brilliancy with the brilliancy of the object and the temperature is read from scale 10E using as the pointer or index for scale 10E the mark 1.0 on the emissivity scale 89C; or that mark 1.0 is the graduation to which the index 65 is set for reading of temperatures from scale 10E. When the instrument is sighted upon a non-black body the wedge W is adjusted as before but there is now used as the index for temperature scale 10E or for setting of index 65 that graduation of the emissivity scale 89C corresponding to the known emissivity of the non-black body. By reading scale 10E opposite graduation 1.0 of the scale 89C, the "apparent" temperature of non-black bodies is also determinable from the same scale 10E and without need to refer to any other scales, or charts, or to make any further settings or calculations.

The screen ES may be omitted from the system of Fig. 17 by so shaping the pole pieces 90 of the magnet of meter M (Fig. 19) that the temperature scale 10F follows the aforesaid law that displacement along the scale from one temperature to another is proportional to the difference of the reciprocals of said temperatures (expressed as degrees Kelvin) and by providing an emissivity scale 89D following the aforesaid logarithmic law and dimensioned as above directed. For direct reading of true temperatures of a non-black body, temperature scale 10F is adjusted so that an index thereon registers with that graduation on scale 89D corresponding with the known emissivity of the body.

By so predetermining the resistance of slidewire R1 for successive units of its length that the temperature scale follows, for the type of pyrometer lamp in use, the same aforesaid law as applied to the temperature scales of Figs. 18 and 19, the same method of emissivity correction utilized in the pyrometers of Figs. 18 and 19 may be utilized, as indicated in Fig. 20, with the potentiometric pyrometer of Figs. 1, 1a. With pyrometer lamps having characteristics exemplified by curves such as L, L1, L2 of Fig. 2a, and utilizing a slidewire affording equal increments of change of resistance for successive equal movements of contact CR1, the temperature scale closely follows that law; for other types of lamps it may be necessary to obtain, in any known manner, a different displacement-resistance characteristic of the slidewire CR1.

The procedure up to the point of reading of the scale 10G is the same as heretofore described in connection with Figs. 1 and 1a; after optical match has been effected, and the potentiometer contact CR1 adjusted to final or exact balance, the true temperature is read from scale 10G (adjustable with contact CR1) using as the index for scale 10G that graduation of the emissivity scale 89E which corresponds to the known emissivity of the particular body or material whose temperature is being measured; or, alternatively, the index 65 for scale 10G may be set in accordance with emissivity scale 89E.

When the instrument of Figs. 3 to 10, for example, is neither provided with an emissivity correction screen, such as shown in Fig. 13 or 14, nor with an emissivity-correction scale as shown in Fig. 20, recourse may be had to the device shown in Fig. 21 whose scales 10H and 89F follow the same laws and are related as above specified in connection with Fig. 18. After the operator, by use of an optical pyrometer, of any type whatsoever calibrated for black-body conditions, has determined the "apparent" temperature of a non-black body, he can determine its true temperature by setting the scale disk 10H so that the observed temperature (for example, 1500°, Fig. 21) is opposite the graduation marked 1.0 of emissivity scale 89F and then, using as an index, the mark of scale 89F corresponding to the known emissivity of the body (for example .6, Fig. 21) can read directly from scale 10H the corresponding true temperature.

Preferably, there may be utilized an arm 164 of transparent material having thereon a radial index or scratch 165 (corresponding with index 65, Figs. 3 and 4) to facilitate reading of the true temperature from scale 10H when the index 165 is set to overlie the proper graduation on the emissivity scale 89F. A similar index arm may, of course, be used in the arrangement of Fig. 20 and left clamped to emissivity-correction scale 89E until the apparatus is to be used for reading true temperatures of another material of different emissivity coefficient.

The emissivity coefficient of a non-black body may not be constant through the desired range of its temperature measurement; for example, the emissivity coefficient of molten cast iron is about .4 for temperatures above about 2650° F., is about .7 for temperatures below 2200° F. and from 2200° F. to 2650° F. varies from .7 to .4. With the arrangements of Figs. 18, 20 and 21, the index 65, or 165, is reset manually to the proper positions to follow such changes of the emissivity characteristic. By the auxiliaries shown in Fig. 22, or their equivalent, resetting of the emissivity scale or variation of the setting of the temperature scale index in accordance with different emissivities is effected automatically. By way of illustration, it is assumed the apparatus is to be used for determining the true temperature of molten cast-iron under non-black body conditions and under circumstances for which the temperature of the iron may be within a range including all or part of the aforesaid range of 2200° F. to 2650° F. The angular position of scale 101 is determined by the setting of slidewire contact CR1 of Figs. 1, 1a, or 20, or the setting of wedge W of Fig. 18, and with the scale 101 is movable a cam 270 shaped to compensate for the variation in emissivity of a particular material, for example molten cast iron. The arm 264 which carries the scale index 265 is mounted for angular movement about the axis of scale 101 and is connected by link 271 to an arm 272 supporting a cam follower 273 maintained in engagement with cam 270 by spring 274. Throughout the range of movement of cam 270 corresponding to temperatures above 2650° F., the "high" part of cam 270, of constant radius H, maintains the index 265 in the position corresponding to graduation .4 on the emissivity scale 89G; for the range of movement of cam 270 corresponding to temperatures below 2200° F., the "low" part of cam 270, of constant radius L, maintains the index 265 in position corresponding to calibration mark .7 on the emissivity scale; for the range of temperatures between 2650° F. and 2200° F., the cam 270 so shifts the position of the index 265 that for each temperature read from the relative positions of index 265 and scale 10I, the concurrent position of index 265 with respect to the emissivity scale 89G corresponds with the known emissivity of the material at that temperature.

Accordingly an operator of an optical pyrometer so equipped does not need to concern himself about the variations in emissivity of molten cast iron at different temperatures but merely makes an optical match and then reads the true temperature from scale 10I; when the pyrometer is used with a material having a different variation in emissivity within the range of measurement, cam 270 is replaced by another of contour suited for that material.

Because cam 270 or its equivalent attends to the shift in position of index 265 to compensate for the changes in emissivity of a particular material with temperature, the scale 89G is not necessary and may be omitted. It is, however, of convenience in checking the shape and angular position of a particular cam 270 when the apparatus is used with cams 270 of different shape to suit the different emissivity-temperature characteristics of different materials.

From the foregoing explanation it appears that "apparent" temperature, true temperature and coefficient of emissivity are three dependent variables, and therefore that when the magnitudes of any two of them are known, the magnitude of the third is determined or determinable. In the various arrangements thus far described, it has been shown that when the "apparent" temperature and the emissivity are known, that the true temperature can be read directly from a temperature scale procured as below described. It is also possible with any of the various arrangements of Figs. 1, 1a, 15 to 22, to determine the emissivity of a body by ascertaining its apparent and true temperatures while at the same actual temperature; for example, suppose the pyrometer when sighted upon the outside of a block of nickel (non-black body conditions) indicates the temperature of the block to be 1950° F., and that a substantially concurrent reading obtained by sighting into a deep recess of the block (black body conditions) indicates the temperature of the block to be 2112° F., then from the temperature scale and the emissivity scale it is ascertainable that the emissivity is about .36.

In brief, in those modifications such as Figs. 18 to 22 utilizing temperature and emissivity scales whose scales follow the laws above stated, there is found on the emissivity scale that emissivity whose displacement from graduation 1.0 is equal to that displacement on the temperature scale corresponding to the difference between the aforesaid temperature readings. The procedure for determining the emissivity is somewhat different for the different arrangements disclosed; for example, referring to Fig. 21, the scale 10H is so set that the graduation corresponding to the temperature observed under non-black body conditions is opposite or in register with graduation 1.0 of scale 89F and then from scale 89F is read the emissivity value corresponding to or in register with the graduation of scale 10H corresponding to the aforesaid temperature observed under black body conditions.

In those modifications of Figs. 1, 15, 16 and 17 using a variable emissivity-correction screen ES, the procedure is as follows: with the screen ES at unity emissivity setting, there is effected, under black body conditions, optical match of the brilliance of the standard with the brilliance of the object; then with the body at the same actual temperature but under non-black body conditions, the optical match is restored by changing only the setting of screen ES. The emissivity of the body may then be read directly from the emissivity scale associated with screen ES.

The differences in emissivity between different bodies, or of the same body in different states or under different conditions, e. g. solid or liquid, at different temperatures, affect the apparent temperatures whether they be read with an optical pyrometer or with other known types of radiation pyrometers responsive to radiation within and/or beyond the visible spectrum. Consequently, compensation for differences in emissivity to permit direct reading of true temperature from the scale of such other types of radiation pyrometers may be effected by use of an adjustable calibrated absorption screen ES, or by temperature and emissivity scales following the proper laws. Such pyrometer may use a thermocouple T in a circuit similar to or identical with Fig. 11; radiation from the object falls upon the thermocouple T to cause it to produce an electromotive force which is balanced by adjusting contact CR thus to vary the current from battery B until there is null deflection of galvanometer G1. The voltage drop produced by the flow of battery current through slidewire R1 is thereupon balanced against the standard voltage of cell S by adjusting contact CR1 until there is null deflection of galvanometer G. With the adjustable contact CR1 there is associated the temperature scale 10. The compensation for the differing emissivities of different materials or of the same material under aforesaid certain different conditions may be effected by use of an absorption screen having a calibrated emissivity scale, or alternatively, the slidewire R1 may be so graded that for successive small increments of displacement along scale 10, the ratio of the difference of the temperatures at the beginning and end of each displacement to either of those temperatures is a constant, and with scale 10 is associated a logarithmic emissivity scale whose relation to scale 10 is below stated.

Thus, whether a radiation pyrometer be of a type responsive to a narrow band of radiation, for example, an optical pyrometer, or of a type responsive to a broad band of radiation, for example, a total radiation pyrometer, true temperatures of bodies having different emissivities may be directly read from the same temperature scale provided the associated emissivity scale be logarithmic and that the relation between the scales be such that the displacement between any two emissivity markings on the emissivity scale is proportional to the displacement between any two points of temperature markings on the temperature scale corresponding, respectively, with the two different true temperatures of two bodies having the same apparent temperature but whose emissivities are different and correspond to the aforesaid two markings on the emissivity scale.

In the circuits of Figs. 1, 1a and 11, all of the potentiometer slidewire R1 is always in circuit; consequently when the current demand upon battery B is at a maximum (maximum temperature of filament F for the highest temperature of the range to be measured) a large fraction of the total voltage drop in the circuit is across that portion of the potentiometer slidewire R1 which is between contact CR1 and terminal r1 and therefore not utilized in balancing the voltage of the standard cell, and the filament-heating current needlessly traverses more resistance than essential for balancing purposes. By interchanging the connections from the potentiometer contact and terminal r1 to the standard cell S and rheostat R to obtain the connections indicated in Fig. 23, only that portion of the potentiometer slidewire R1 utilized to produce a voltage for balancing the standard cell voltage is traversed by the filament current; therefore as contact CR1 is set for higher and higher temperatures, less and less of resistance R1 is traversed by the filament current. Consequently, the filament-heating battery B, in the circuit of Fig. 23, has a useful life which is substantially longer than the useful life of a similar battery in the circuit of Figs. 1, 1a and 11; or alternatively, a battery of lower voltage, lesser number of cells, may be used in the circuit of Fig. 23 to cover the same range of filament temperatures which in the circuits of Figs. 1, 1a and 11 requires a greater number of cells; whereas in arrangements of the character of Fig. 1 the voltage of battery B must be of magnitude sufficient to pass the heating current through more resistance than is immediately effective in procuring balance.

In the circuit arrangement shown in Fig. 24, a single slidewire RR1 serves as, or replaces, both the rheostat R and the potentiometer slidewire R1 of the circuits of Figs. 1, 1a and 11. With this circuit arrangement, when contact CR is moved from one position to another to establish different magnitudes of filament current, the contact CR1 must be moved to a different but proportional extent to reestablish potentiometer balance at the new magnitude of slidewire current. If therefore, the contacts CR and CR1 are disengageably coupled for movement in unison during optical matching, or otherwise as herein contemplated, the driving connections between them should include pulleys 152, 154 interconnected by belt 153, or equivalent structure or mechanism, affording that ratio of the concurrent movements of the contacts which insures that the voltage drop across the effective potentiometer portion of resistance RR1 (between point X and contact CR1) is for all concurrent settings of contacts CR and CR1 at least approximately equal to the voltage of the standard cell S.

There is excluded from the scope of that claimed aspect of my invention concerned with compensation for differences in emissivities of different bodies the use of diaphragms, apertures of variable area, or equivalent means ineffective to change the transmission coefficient or to change the amount of radiation transmitted per unit of cross-sectional area of an optical path.

What I claim is:

1. The combination with an optical pyrometer system for measuring true temperatures of non-black bodies comprising a standard of known brilliance-temperature characteristic, means for matching, through optical paths from the eye to said standard and a non-black body, the observed brilliance of said standard with a brilliance dependent upon the temperature of said non-black body, one of said optical paths having at least a portion which is independent of the other of said paths, and a temperature scale calibrated from a body of known coefficient of emissivity at various known temperatures, of means rendering said scale correct for reading therefrom non-black body temperatures comprising means adjustable to vary the transmission per unit area of the cross-section of said independent portion of said one of said paths so to compensate for the differences from aforesaid known coefficient of emissivity of the different coefficients of emissivity of the various non-black bodies whose temperatures are to be measured.

2. The combination with an optical pyrometer system for measuring true temperatures of non-black bodies comprising a standard of known brilliance-temperature characteristic, means for matching, through optical paths from the eye to said standard and a non-black body, the brilliance of said standard with a brilliance dependent upon the temperature of said non-black body, one of said optical paths having at least a portion which is independent of the other of said paths, and a temperature scale calibrated from a black body at various temperatures, of means rendering said scale correct for reading therefrom non-black body temperatures comprising means adjustable to cary the transmission per unit area of the cross-section of said independent portion of said one of said paths so to compensate for the differences from the coefficient of emissivity of said black body of the different coefficients of emissivity of the various non-black bodies whose temperatures are to be measured.

3. An optical pyrometer system including a standard body of known brilliance-temperature characteristic viewed concurrently with an incandescent body whose temperature is to be determined, the optical path from one of said bodies to the eye having at least a portion independent of the path from the other of said bodies to the eye, means adjustable to vary the observed brilliance of one of said bodies to effect an optical match of their brilliancies, a temperature scale associated with said adjustable means, and means for compensating for differences in the emissivity coefficients of different non-black bodies to provide for direct reading from said scale of their true temperatures under non-black body conditions comprising means adjustable to vary the transmission per unit area of the cross-section of said independent portion of one of said paths.

4. An optical pyrometer system including a standard body viewed concurrently with an incandescent body whose temperature is to be determined, the optical path from one of said bodies to the eye having at least a portion independent of the path from the other of said bodies to the eye, means adjustable to vary the observed brilliance of one of said bodies to effect an optical match of their brilliancies, a temperature scale, and optical means in said independent portion of one of said paths for transmitting radiation from one of said bodies and whose transmission per unit area of cross-section of said independent portion is selected to compensate for the differences in emissivity of different non-black bodies to provide for direct reading from said scale of their true temperatures under non-black body conditions.

5. An optical pyrometer system including a pyrometer lamp whose filament is viewed concurrently with an incandescent body, a source of current for heating said filament, a potentiometer having an adjustable element, connections for including said potentiometer in circuit with said filament, means adjustable to vary the filament-heating current which traverses said potentiometer, a source of known fixed voltage, connecting means for balancing against said known voltage a fraction of voltage derived by said potentiometer from said filament-heating current and which fraction is determined by the setting of said adjustable element, and a scale associated with said adjustable element of said potentiometer.

6. An optical pyrometer system including a filament viewed concurrently with an incandescent body, a source of current for heating said filament, resistance in circuit with said filament, means adjustable to vary the filament-heating current which traverses said resistance, a source of known fixed voltage, connecting means for opposing to said known voltage the voltage produced by flow of aforesaid current through said resistance, said connecting means including an adjustable means associated with said resistance to effect balance of said known voltage with that portion of the second-named voltage selected by the second-named adjustable means, and a temperature-determining scale cooperating with said second adjustable means.

7. An optical pyrometer system including a filament viewed concurrently with an incandescent body, a source of current for heating said filament, a potentiometer having an adjustable element, connections for including said potentiometer in circuit with said filament, means adjustable to vary the filament-heating circuit which traverses said potentiometer, a standard cell, connecting means for balancing against the voltage of said cell a fraction of the voltage derived from said current by said potentiometer, which fraction is determined by the setting of said adjustable element, a scale associated with said adjustable element of said potentiometer, and means for avoiding drain of appreciable current from said cell comprising switch means included in said connecting means and operable to connect and disconnect said cell.

8. An optical pyrometer system including a filament viewed concurrently with an incandescent body, a source of current for heating said filament, a potentiometer resistance having an adjustable contact, a rheostat for varying the magnitude of the heating current in circuit with said source and said resistance, and a source of known voltage connected in circuit between one terminal of said resistance and a point whose potential is determined by the position of said adjustable contact to effect balance between said known voltage and the difference of potential between said contact and said one terminal.

9. An optical pyrometer system including a filament viewed concurrently with an incandescent body, a source of current for heating said filament, a balanceable network in circuit with said filament and said source and comprising resistances having adjustable elements one of which varies the filament current by varying as of said resistances, a source of standard voltage, means included in said network, and including the other of said adjustable elements, for opposing said standard voltage to the voltage derived by flow of filament heating current through the other of said resistances, disengageable mechanical means coupling said elements for adjustment in unison to match the observed brilliances of said filament and said body and to effect approximate balance of said network, and means for individually adjusting one of said elements to effect final balance of said network for determination of the temperature of said body.

10. An optical pyrometer system including a filament viewed concurrently with an incandescent body, a potentiometer resistance having an adjustable element for selection of various percentages of the voltage across its terminals, a source of current for heating said filament, a resistance in circuit with said potentiometer resistance, filament, and current source, said second resistance having an element adjustable to vary the heating current for said filament to match its brilliance with the brilliance of said body and concurrently to vary the current through said potentiometer resistance, a source of known fixed voltage poled to oppose the voltage derived by the potentiometer resistance from said current, connections for including said source of known voltage in circuit with the portion of said potentiometer resistance selected by its adjustable element, means for effecting concurrent movement of the adjustable elements of said resistances to cause the adjustable element of the potentiometer to select a percentage of said first-mentioned voltage approximately equal to said known voltage during matching of the aforesaid brilliancies, and means for individually adjusting one of said elements to effect balance of said known voltage and said selected voltage.

11. An optical pyrometer system comprising a telescope having a lamp therein, a control box for housing a source of current for said lamp, a standard cell, a rheostat, a potentiometer, and indicating means, a circuit including said lamp, said source of current, said rheostat and said potentiometer, a second circuit including said standard cell, said potentiometer and said indicating means and switching means on said telescope for closing said first circuit for adjustment of said rheostat to match the brilliance of said lamp with the brilliance of a body whose temperature is to be determined and to vary the potentiometer voltage, and for closing said second circuit for balancing of the potentiometer voltage against the voltage of said standard cell for determination of said temperature.

12. An optical pyrometer system comprising a telescope having a lamp therein, a control box for housing a source of current for said lamp, a standard cell, a rheostat, a potentiometer, and indicating means, a circuit including said lamp, said source of current, said rheostat and said potentiometer, a second circuit including said standard cell, said potentiometer and said indicating means, switching means on said telescope for closing said first circuit for adjustment of said rheostat to match the brilliance of said lamp with the brilliance of a body whose temperature is to be determined and to vary the potentiometer voltage, and for closing said second circuit for balancing of the potentiometer voltage against the voltage of said standard cell for determination of said temperature, and switching means on said control box included in said second circuit and closed during said rebalancing.

13. An optical pyrometer system comprising a telescope having a lamp therein, a control box for housing a source of current for said lamp, a standard cell, a rheostat, a potentiometer, and a standard cell, a rheostat, a potentiometer, and indicating means, a circuit including said lamp, said source of current, said rheostat and said potentiometer, a second circuit including said standard cell, said potentiometer and said indicating means, switching means on said telescope for closing said first circuit for adjustment of said rheostat to match the brilliance of said lamp with the brilliance of a body whose temperature is to be measured and to vary the potentiometer voltage, and for closing said second circuit for balancing of the potentiometer voltage against the voltage of said standard cell for determination of said temperature, a switch in said second circuit, and means for adjusting said potentiometer to effect aforesaid balance and for closing said last-named switch during said adjustment.

14. An optical pyrometer system including an element heated to incandescence by electric current and viewed concurrently with an incandescent body, an impedance traversed by said current and having an adjustable member, means operable to vary the magnitude of said current and so vary the drop of potential across said impedance during matching of the brilliancies of said element and said body, a source of standard voltage in circuit between a terminal of said impedance and a point whose potential is determined for each magnitude of said current by the position of said adjustable member, and a scale associated with said adjustable member and cooperating therewith in determination of the temperature of said body when said member is in position effecting balance between the standard voltage and the potential difference between said point and said terminal of said impedance.

15. An optical pyrometer system including an element heated to incandescence by electric current and viewed concurrently with an incandescent body, an impedance traversed by said current and having an adjustable circuit-balancing member, a member adjustable independently of said balancing member to vary the magnitude of said current and so vary the drop of potential across said impedance during matching of the brilliancies of said element of said body, a source of standard voltage connected between a terminal of said impedance and a point whose potential is determined for each magnitude of said current by the position of said first adjustable member, and a scale associated with said balancing member and cooperating therewith in determination of the temperature of said body when said member is in position effecting balance between the standard voltage and the potential difference between said point and said terminal of said impedance.

16. A member having thereon a temperature scale covering a range of temperatures determinable by optical-pyrometry and so graduated that displacement along the scale from one temperature graduation to another is substantially proportional to the difference between the reciprocals of the absolute temperatures corresponding with said graduations, a second member having thereon a logarithmic emissivity scale characterized by the fact that the distance between any two of its graduations is equal to the distance between any two points in said temperature scale corresponding with the true temperatures of two bodies having the same apparent temperature and whose emissivities correspond with aforesaid two graduations of said emissivity scale, and structure supporting said members adjacent each other for such relative movement that said emissivity scale coacts with said temperature scale to afford direct determination from said temperature scale of the true temperatures of non-black bodies having different emissivities.

17. In a pyrometer system for direct measurement of true temperatures of bodies of different emissivities or of a body under different conditions for which its emissivities differ, a member having thereon a logarithmic emissivity scale, a second member having thereon a temperature scale so graduated that the displacements between points corresponding to true temperatures of bodies at the same apparent temperature but of differing emissivities are proportional to displacements on said emissivity scale between points thereof corresponding with said different emissivities, and structure supporting said members adjacent each other for such relative movement that said emissivity scale coacts with said temperature scale to afford direct determination from said temperature scale of the true temperatures of non-black bodies having different emissivities.

18. An optical pyrometer system including a standard of known brilliance-temperature characteristic viewed concurrently with an incandescent body whose temperature is to be determined, means adjustable to effect match of the brilliance of said standard with the brilliance of said body, a member having thereon a temperature scale associated with said adjustable means of the pyrometer so calibrated that displacement along the scale from one temperature graduation to another is substantially proportional to the difference between the reciprocals of those temperatures expressed in degrees of absolute temperature, a second member having thereon a logarithmic emissivity-correction scale, and structure for supporting said emissivity scale for movement with respect to said temperature scale to serve as an index therefor, said emissivity scale being characterized by the fact that the distance between any two of its graduations is substantially equal to the distance between any two points in said temperature scale corresponding with the true temperatures of two bodies having the same apparent temperature and whose emissivities correspond with aforesaid two graduations of said emissivity scale.

19. In the use of an optical pyrometer having a temperature scale calibrated from a body of known emissivity by comparison of the brilliance thereof at various known temperatures with the brilliance of the standard hot body of the pyrometer as observed through optical paths of known transmissions per unit of cross-sectional area and in which the position of said scale relative to its index is varied in accordance with adjustment of an element varying the observed brilliance of one of said bodies, the method of determining the true temperature of a third body of known emissivity different from aforesaid known emissivity which comprises varying the transmission per unit of cross-sectional area of one of said paths to an extent compensatory for the difference between said emissivities, matching the observed brilliance of the standard hot body with the observed brilliance of said third body by adjusting said element and effecting corresponding relative movement of said scale and index, and from said scale directly reading the true temperature of said third body.

20. In the use of an optical pyrometer having a temperature scale calibrated from a body of known emissivity by comparison of the brilliance thereof at various known temperatures with the brilliance of the standard hot body of the pyrometer as observed through optical paths of known transmissions per unit of cross-sectional area and in which the position of said scale relative to its index is varied in accordance with adjustment of an element varying the observed brilliance of one of said bodies, the method of determining the true temperature of a third body of known emissivity different from aforesaid known emissivity which comprises varying the transmission per unit of cross-sectional area of one of said paths to an extent making the ratio of its transmissions per unit of cross-sectional area inversely proportional to the ratio of said emissivities, matching the observed brilliance of the standard hot body with the observed brilliance of said third body by adjusting said element and effecting corresponding relative movement of said scale and index, and from said scale directly reading the true temperature of said third body.

21. In the use of an optical pyrometer having a temperature scale calibrated from a black body by comparison of the brilliance thereof at various known temperatures with the brilliance of the standard hot body of the pyrometer as observed through optical paths of known transmissions per unit of cross-sectional area and in which adjustment of an element to vary the observed brilliance of one of said bodies determines the position of said scale with respect to its index, the method of determining the true temperature of a non-black body, of known emissivity, which comprises increasing the transmission per unit of cross-sectional area of one of said paths to an extent making the ratio of its transmissions per unit of cross-sectional area proportional to the ratio between the known emissivity of the non-black body and the emissivity of a black body, matching the observed brilliance of said standard hot body with the observed brilliance of said non-black body by adjusting said element and effecting corresponding relative movement of said scale and index, and reading the true temperature of said non-black body directly from said scale.

22. In the method of measuring the temperature of an incandescent body the steps of matching the brilliance of said body with the brilliance of an electrically heated element of known current-temperature characteristic by varying the magnitude of the heating current, producing across a resistance, calibrated in a function of temperature, a difference of potential of magnitude determined by that magnitude of said heating current effecting aforesaid match of brilliancies, adjusting a contact relative to said resistance to derive from said difference of potential an electromotive force of magnitude at least approximately equal to the open-circuit electromotive force of a source whose accuracy as a standard would be impaired by drain of appreciable current therefrom, thereafter opposing said derived electromotive force directly against that of said standard source and varying said derived electromotive force to effect balance thereof with the electromotive force of said standard source without drain of appreciable current therefrom, and from the relative positions of said resistance and contact at balance of said electromotive forces, determining the said function of temperatures of said incandescent body.

23. In the use of an optical pyrometer having a temperature scale calibrated from a body of known emissivity by comparison of the brilliance thereof at various known temperatures with the brilliance of the standard hot body of the pyrometer as observed through optical paths of known transmissions per unit of cross-sectional area and in which the position of said scale relative to its index is varied in accordance with adjustment of an element varying the observed brilliance of one of said bodies, the method of determining the true temperature of a third, non-black, body of known emissivity which comprises concurrently observing, through optical paths from them to the eye, said third, non-black, body and said standard hot body, transmitting to the eye such a fraction of the radiation per unit of cross-sectional area of one of said paths that the ratio between said fraction and the total radiation per unit of cross-sectional area of said one of said paths is proportional to the ratio between said known emissivities, matching the brilliances of said standard and non-black bodies by varying the observed brilliance of one of them and concurrently correspondingly adjusting the relative positions of said scale and index, and from said scale and index reading the true temperature of said non-black body.

RAYMOND C. MACHLER.

CERTIFICATE OF CORRECTION.

Patent No. 2,252,015. August 12, 1941.

RAYMOND C. MACHLER.

It is hereby certified that error appears in the printed specification of the above numbered patent requiring correction as follows: Page 3, second column, line 22, for "slidewise" read --slidewire--; page 6, first column, line 8, for "adjoining" read --adjusting--; page 10, second column, line 22, for "scren" read --screen--; page 12, second column, line 72, for "of" read --or--; page 13, second column, line 36, claim 2, for "cary" read --vary--; page 14, second column, line 1, claim 9, for "as" read --one--; and that the said Letters Patent should be read with this correction therein that the same may conform to the record of the case in the Patent Office.

Signed and sealed this 18th day of November, A. D. 1941.

(Seal)

Henry Van Arsdale,
Acting Commissioner of Patents.